United States Patent
Tamura

(10) Patent No.: US 11,440,354 B2
(45) Date of Patent: Sep. 13, 2022

(54) PNEUMATIC TIRE

(71) Applicant: The Yokohama Rubber Co., LTD., Tokyo (JP)

(72) Inventor: Masashi Tamura, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 248 days.

(21) Appl. No.: 16/632,522

(22) PCT Filed: Jun. 29, 2018

(86) PCT No.: PCT/JP2018/024921
§ 371 (c)(1),
(2) Date: Jan. 20, 2020

(87) PCT Pub. No.: WO2019/035281
PCT Pub. Date: Feb. 21, 2019

(65) Prior Publication Data
US 2020/0223263 A1     Jul. 16, 2020

(30) Foreign Application Priority Data

Aug. 18, 2017    (JP) .............................. JP2017-157995
Aug. 18, 2017    (JP) .............................. JP2017-158036

(51) Int. Cl.
*B60C 13/02*       (2006.01)
*B60C 13/00*       (2006.01)

(52) U.S. Cl.
CPC .......... *B60C 13/009* (2013.01); *B60C 13/002* (2013.01)

(58) Field of Classification Search
CPC ..... B60C 13/00; B60C 13/001; B60C 13/002; B60C 13/02; B60C 13/023
See application file for complete search history.

(56) References Cited

U.S. PATENT DOCUMENTS

| 4,413,663 A | 11/1983 | Sullenger |
| 2003/0005993 A1 | 1/2003 | Omoto et al. |

(Continued)

FOREIGN PATENT DOCUMENTS

| CN | 1781739 | 6/2006 |
| CN | 101522442 | 9/2009 |

(Continued)

OTHER PUBLICATIONS

Machine translation of JP 2004-175133, 2004.*
International Search Report for International Application No. PCT/JP2018/024921 dated Jul. 24, 2018, 3 pages, Japan.

*Primary Examiner* — Justin R Fischer
(74) *Attorney, Agent, or Firm* — Thorpe North & Western

(57) ABSTRACT

A pneumatic tire includes: sidewall portions positioned on both sides in a tire lateral direction; bead portions positioned toward the inside of the respective sidewall portions in a tire radial direction; a plurality of protectors extending in a tire circumferential direction and projecting from a surface of the sidewall portion in the sidewall portion of at least one of the sidewall portions, provided within a range of from 30% to 70% of a tire cross-sectional height from an inner end of the bead portions in the tire radial direction toward an outer side in the tire radial direction; and a plurality of helical reinforcing members each formed in a helical shape and disposed inside the plurality of protectors, the helical reinforcing members each having a central axis of the helical shape, the central axis extending in the tire circumferential direction.

15 Claims, 16 Drawing Sheets

(56) References Cited

U.S. PATENT DOCUMENTS

2006/0118227 A1   6/2006  Miki
2009/0308512 A1  12/2009  Nakamura

FOREIGN PATENT DOCUMENTS

| GB | 400757      | * | 11/1933 |
|----|-------------|---|---------|
| JP | H06-006006  |   | 1/1994  |
| JP | H06-316206  |   | 11/1994 |
| JP | H08-058318  |   | 3/1996  |
| JP | 2003-002016 |   | 1/2003  |
| JP | 2004-026061 |   | 1/2004  |
| JP | 2004-175133 | * | 6/2004  |
| JP | 3628279     |   | 3/2005  |
| JP | 2014-019397 |   | 2/2014  |
| WO | WO 00/12329 | * | 3/2000  |
| WO | WO 2008/038461 | | 4/2008  |

\* cited by examiner

FIG. 13A

|  | CONVENTIONAL EXAMPLE 1-1 | CONVENTIONAL EXAMPLE 1-2 | EXAMPLE 1-1 | EXAMPLE 1-2 | EXAMPLE 1-3 | EXAMPLE 1-4 | EXAMPLE 1-5 |
|---|---|---|---|---|---|---|---|
| REINFORCING MEMBER | NO | ELASTIC REINFORCING MEMBER | HELICAL REINFORCING MEMBER | HELICAL REINFORCING MEMBER | HELICAL REINFORCING MEMBER | HELICAL REINFORCING MEMBER | HELICAL REINFORCING MEMBER |
| NUMBER OF REINFORCING MEMBERS | - | 3 | 2 | 2 | 2 | 2 | 2 |
| $\phi s/\phi p$ | - | - | 0.7 | 0.09 | 0.95 | 0.7 | 0.7 |
| WIRE DIAMETER $\phi w$ [mm] | - | - | 0.7 | 0.7 | 0.7 | 0.4 | 10.1 |
| NUMBER OF SIDE-CUTS | 20 | 18 | 19 | 18 | 19 | 18 | 19 |
| CUT LENGTH [mm] | 150 | 90 | 90 | 95 | 80 | 95 | 70 |
| CUT DEPTH [mm] | 25 | 15 | 10 | 20 | 5 | 15 | 8 |
| REINFORCING MEMBER DROPPING-OFF PLACE | - | 7 | 0 | 0 | 1 | 0 | 0 |

| | EXAMPLE 1-6 | EXAMPLE 1-7 | EXAMPLE 1-8 | EXAMPLE 1-9 | EXAMPLE 1-10 | EXAMPLE 1-11 | EXAMPLE 1-12 |
|---|---|---|---|---|---|---|---|
| REINFORCING MEMBER | HELICAL REINFORCING MEMBER | HELICAL REINFORCING MEMBER | HELICAL REINFORCING MEMBER | HELICAL REINFORCING MEMBER | HELICAL REINFORCING MEMBER | HELICAL REINFORCING MEMBER | HELICAL REINFORCING MEMBER |
| NUMBER OF REINFORCING MEMBERS | 3 | 3 | 3 | 3 | 3 | 3 | 3 |
| $\phi s/\phi p$ | 0.2 | 0.7 | 0.9 | 0.09 | 0.95 | 0.7 | 0.7 |
| WIRE DIAMETER $\phi w$ [mm] | 0.7 | 0.7 | 0.7 | 0.7 | 0.7 | 0.4 | 10.1 |
| NUMBER OF SIDE-CUTS | 18 | 18 | 18 | 18 | 19 | 18 | 18 |
| CUT LENGTH [mm] | 85 | 70 | 85 | 90 | 95 | 90 | 65 |
| CUT DEPTH [mm] | 15 | 8 | 7 | 10 | 5 | 14 | 8 |
| REINFORCING MEMBER DROPPING-OFF PLACE | 0 | 0 | 0 | 0 | 1 | 0 | 0 |

FIG. 13B

| | CONVENTIONAL EXAMPLE 2-1 | CONVENTIONAL EXAMPLE 2-2 | EXAMPLE 2-1 | EXAMPLE 2-2 | EXAMPLE 2-3 |
|---|---|---|---|---|---|
| REINFORCING MEMBER | NO | ELASTIC REINFORCING MEMBER ALONE | ELASTIC REINFORCING MEMBER + HELICAL REINFORCING MEMBER | ELASTIC REINFORCING MEMBER + HELICAL REINFORCING MEMBER | ELASTIC REINFORCING MEMBER + HELICAL REINFORCING MEMBER |
| STRENGTH AT BREAK OF ELASTIC REINFORCING MEMBER [MPa] | - | 30 | 30 | 5 | 60 |
| ELONGATION AT BREAK OF ELASTIC REINFORCING MEMBER [%] | - | 200 | 200 | 200 | 200 |
| φs/φp | - | 0.6 | 0.6 | 0.6 | 0.6 |
| WIRE DIAMETER φw OF HELICAL REINFORCING MEMBER [mm] | - | - | 0.7 | 0.7 | 0.7 |
| NUMBER OF SIDE-CUTS | 20 | 18 | 17 | 18 | 18 |
| CUT LENGTH [mm] | 150 | 90 | 80 | 85 | 75 |
| CUT DEPTH [mm] | 25 | 15 | 10 | 8 | 5 |
| DEFORMED ELASTIC REINFORCING MEMBER | - | YES | NO | NO | NO |

FIG. 14A

| REINFORCING MEMBER | EXAMPLE 2-4<br>ELASTIC REINFORCING MEMBER<br>+<br>HELICAL REINFORCING MEMBER | EXAMPLE 2-5<br>ELASTIC REINFORCING MEMBER<br>+<br>HELICAL REINFORCING MEMBER | EXAMPLE 2-6<br>ELASTIC REINFORCING MEMBER<br>+<br>HELICAL REINFORCING MEMBER | EXAMPLE 2-7<br>ELASTIC REINFORCING MEMBER<br>+<br>HELICAL REINFORCING MEMBER | EXAMPLE 2-8<br>ELASTIC REINFORCING MEMBER<br>+<br>HELICAL REINFORCING MEMBER |
|---|---|---|---|---|---|
| STRENGTH AT BREAK OF ELASTIC REINFORCING MEMBER [MPa] | 30 | 30 | 30 | 30 | 30 |
| ELONGATION AT BREAK OF ELASTIC REINFORCING MEMBER [%] | 100 | 200 | 200 | 200 | 200 |
| φs/φp | 0.6 | 0.09 | 0.95 | 0.6 | 0.6 |
| WIRE DIAMETER φw OF HELICAL REINFORCING MEMBER [mm] | 0.7 | 0.7 | 0.7 | 0.4 | 10.1 |
| NUMBER OF SIDE-CUTS | 17 | 18 | 19 | 18 | 19 |
| CUT LENGTH [mm] | 100 | 95 | 75 | 85 | 80 |
| CUT DEPTH [mm] | 10 | 14 | 7 | 12 | 5 |
| DEFORMED ELASTIC REINFORCING MEMBER | NO | NO | NO | NO | NO |

FIG. 14B

PNEUMATIC TIRE

TECHNICAL FIELD

The present technology relates to a pneumatic tire.

BACKGROUND ART

Pneumatic tires used in vehicles that travel on unpaved roads often contact stones and the like on a road surface with sidewall portions of the pneumatic tires during traveling of the vehicles, so that the sidewall portions are likely to be damaged. For this reason, some conventional pneumatic tires have reinforced sidewall portions suppressing damage to the sidewall portions. For example, the pneumatic tire described in Japan Unexamined Patent Publication No. 2014-019397 provides improved cut resistance by being provided with not only a plurality of protectors having an uneven shape extending in a tire circumferential direction in sidewall portions, but also a reinforcing layer formed of organic fibers along an outer surface of the protectors. In addition, the pneumatic tire for a construction vehicle described in Japan Patent No. 3628279 provides an improved reinforcing effect of a protector by being provided with at least two projecting protectors extending in a tire circumferential direction in its sidewall portion, and by embedding elastic reinforcing member inside each of the protectors.

Unfortunately, when a reinforcing member made of a material different from a rubber material constituting a sidewall portion is disposed on a protector of the sidewall portion as in Japan Unexamined Patent Publication No. 2014-019397 and Japan Patent No. 3628279, it may be difficult to ensure adhesiveness between the reinforcing member and the rubber material. In this case, when stones or the like on a road surface come into contact with the protector, the reinforcing member may peel away from the rubber material and drop off from the sidewall portion. When the reinforcing member drops off, the reinforcing effect of the sidewall portion with the protector is greatly reduced, but to still reinforce the sidewall portion, it is effective to dispose a reinforcing member made of a material different from the rubber material. Accordingly, it has become very difficult to suppress the dropping off of the reinforcing member while the reinforcing member effective for reinforcing the sidewall portion is disposed.

In addition, when a member having elasticity as in Japan Patent No. 3628279 is used as a reinforcing member disposed in a protector of a sidewall portion, the reinforcing member may deform due to pressure during vulcanization molding when a green tire is formed by the vulcanization molding. Specifically, the reinforcing member may deform in a direction in which the reinforcing member decreases in thickness in a thickness direction of the sidewall portion due to the pressure during vulcanization molding. In this case, when the reinforcing member excessively decreases in thickness, it may be difficult to suppress damage to the sidewall portion with the reinforcing member when stones and the like on the road surface come into contact with the protector. As described above, while deformation of the reinforcing member when a member having elasticity is used for the reinforcing member disposed in the protector of the sidewall portion influences the reinforcement by the reinforcing member, it is very difficult to dispose the reinforcing member in the sidewall portion without deforming the reinforcing member formed of the member having elasticity.

SUMMARY

The present technology is made in light of the foregoing. The present technology provides a pneumatic tire capable of suppressing dropping off of a reinforcing member while a sidewall portion is reinforced by a reinforcing member. The present technology provides a pneumatic tire capable of suppressing deformation of the reinforcing member having elasticity.

A pneumatic tire according to an embodiment of the present technology includes: sidewall portions positioned on both sides in a tire lateral direction, bead portions positioned toward the inside of the respective sidewall portions in a tire radial direction; a plurality of protectors extending in a tire circumferential direction and projecting from a surface of the sidewall portion in the sidewall portion of at least one of the sidewall portions, provided within a range of from 30% to 70% of a tire cross-sectional height from an inner end of the bead portions in the tire radial direction toward an outer side in the tire radial direction, and a plurality of helical reinforcing members each formed in a helical shape and disposed inside the plurality of protectors, the helical reinforcing members each having a central axis of the helical shape, the central axis extending in the tire circumferential direction.

In the pneumatic tire described above, the plurality of helical reinforcing members is preferably disposed concentrically about a tire center.

In the pneumatic tire described above, one or more of the plurality of helical reinforcing members are preferably disposed at any position on a tire circumference in the sidewall portion where the plurality of helical reinforcing members are disposed.

The pneumatic tire described above preferably includes elastic reinforcing members covered with one of the plurality of helical reinforcing members.

In the pneumatic tire described above, the plurality of helical reinforcing members and the elastic reinforcing members are preferably disposed concentrically about the tire center.

In the pneumatic tire described above, one or more of the plurality of helical reinforcing members and the elastic reinforcing members are preferably disposed at any position on the tire circumference in the sidewall portion where the plurality of helical reinforcing members and the elastic reinforcing members are disposed.

In the pneumatic tire described above, the elastic reinforcing member preferably has a 100% modulus within a range of from 5 times to 25 times a 100% modulus of a rubber composition of the sidewall portion adjacent to the plurality of helical reinforcing members.

In the pneumatic tire described above, the elastic reinforcing member preferably has an elongation at break of 150% or more with a strength at break within a range of from 10 MPa to 50 MPa.

In the pneumatic tire described above, each of the plurality of protectors preferably has a semicircular shape in a meridian cross-section of the pneumatic tire, and each of the plurality of helical reinforcing members preferably has an outer diameter $\phi s$ in a range of $0.1 \leq (\phi s/\phi p) \leq 0.9$ with respect to a semicircular diameter $\phi p$ of each of the plurality of protectors.

In the pneumatic tire described above, the plurality of helical reinforcing members each preferably have a wire diameter φw in the range 0.5 mm≤φw≤10.0 mm.

The pneumatic tire according to an embodiment of the present technology achieves, while a sidewall portion is reinforced by the reinforcing member, a primary effect of enabling suppressing dropping off of the reinforcing members, and also a second effect of enabling suppressing deformation of the reinforcing members having elasticity.

BRIEF DESCRIPTION OF DRAWINGS

FIG. 13A is a table showing results of first performance evaluation tests of pneumatic tires.

FIG. 13B is a table showing results of the first performance evaluation tests of pneumatic tires.

FIG. 14A is a table showing results of second performance evaluation tests of pneumatic tires.

FIG. 14B is a table showing results of the second performance evaluation tests of pneumatic tires.

DETAILED DESCRIPTION

Pneumatic tires according to embodiments of the present technology are described in detail below with reference to the drawings. However, the present technology is not limited by the embodiments. Constituents of the following embodiments include elements that can be substituted or easily conceived by one skilled in the art, or elements that are substantially identical.

First Embodiment

In the description below, "tire lateral direction" refers to the direction parallel to a rotation axis of a pneumatic tire, "toward the inside in the tire lateral direction" refers to the direction toward the tire equatorial plane in the tire lateral direction, and "toward the outside in the tire lateral direction" refers to the direction opposite the direction toward the tire equatorial plane in the tire lateral direction. In addition, "tire radial direction" refers to the direction orthogonal to the tire rotation axis, "toward the inside in the tire radial direction" refers to the direction toward the tire rotation axis in the tire radial direction, and "toward the outside in the tire radial direction" refers to the direction away from the tire rotation axis in the tire radial direction. "Tire circumferential direction" refers to the direction of rotation about the tire rotation axis. In the description below, a meridian cross-section refers to a cross-section of the tire taken along a plane including the tire rotation axis.

Figure 1:
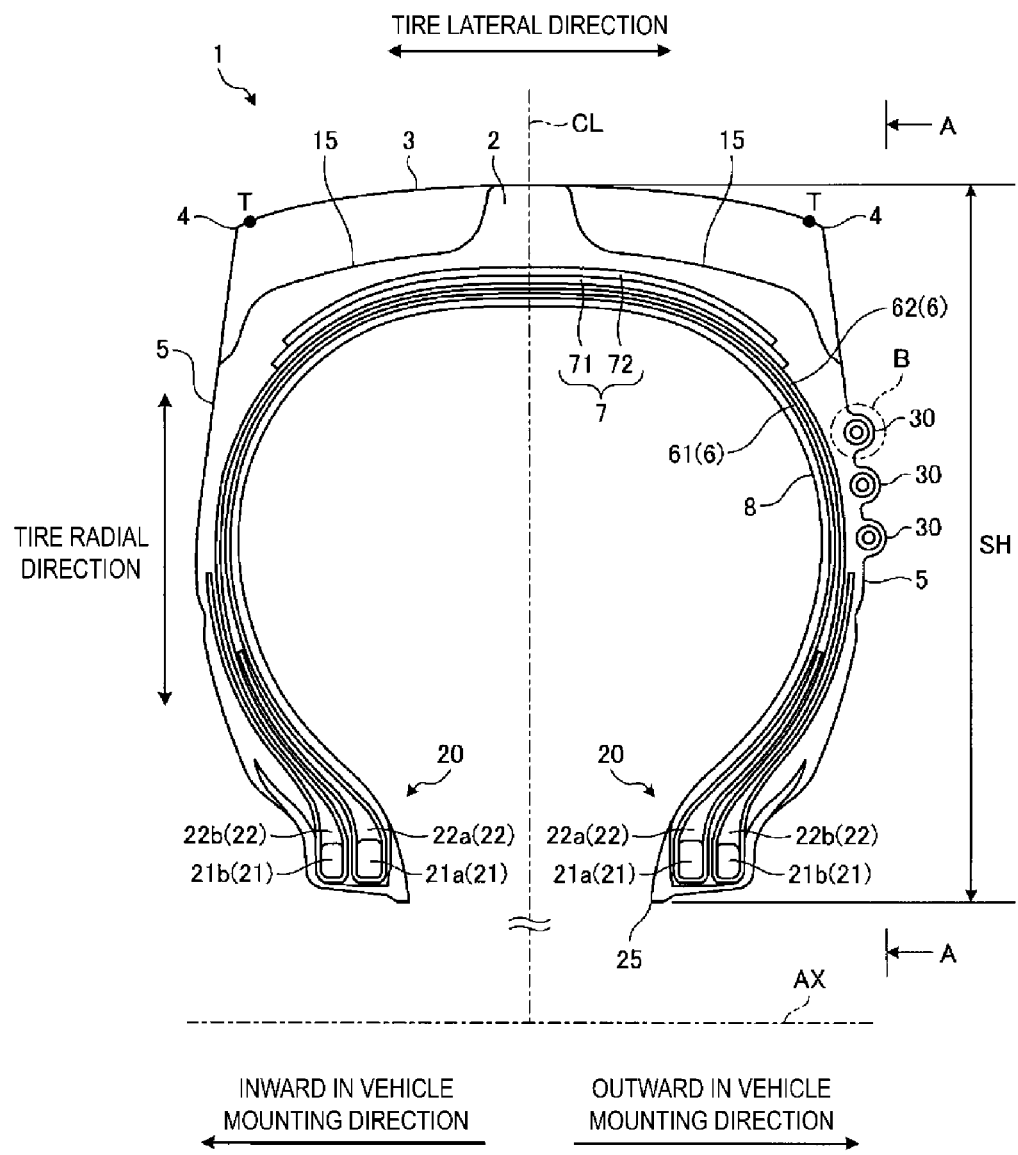
FIG. 1 is a meridian cross-sectional view illustrating a main portion of a pneumatic tire according to a first embodiment.

FIG. 1 is a meridian cross-sectional view illustrating a main portion of a pneumatic tire 1 according to a first embodiment. The pneumatic tire 1 according to the present first embodiment has a defined direction for being mounted on a vehicle, i.e., a defined direction when a tire is mounted on a vehicle, so that the pneumatic tire 1 is mounted on a rim of a vehicle in the defined direction when being mounted on the vehicle. The pneumatic tire 1 according to the present first embodiment is a construction vehicle tire called an off the road tire (OR tire). The pneumatic tire 1 illustrated in FIG. 1 as the present first embodiment is provided with a tread portion 2 in its outermost portion in the tire radial direction as viewed in a meridian cross-section, and the tread portion 2 includes a surface, i.e., a portion that comes into contact with a road surface when a vehicle (not illustrated) mounted with the pneumatic tire 1 travels, being formed as a tread surface 3.

The tread surface 3 is formed with a plurality of lug grooves 15 at predetermined intervals in the tire circumferential direction. The lug groove refers to a lateral groove having a groove width of 10 mm or more in case of a construction vehicle tire, for example. The lug grooves 15 extend in the tire lateral direction and open to a tire ground contact edge T, and the lug grooves 15 also open to tread edges on both sides in the tire lateral direction. At this time, the lug grooves 15 may extend parallel to the tire lateral direction, or may extend inclined at an angle with respect to the tire lateral direction. While the tread surface 3 is formed with only the lug grooves 15 in the first embodiment, the tread surface 3 may be formed with a circumferential groove extending in the tire circumferential direction.

The tread edges refer to both ends of a tread pattern portion of the tire. The tire ground contact edge T refers to a maximum width position in the tire axial direction of a contact surface between the tire and a flat plate when the pneumatic tire 1 mounted on a specified rim and inflated to specified internal pressure is placed vertically on the flat plate in a static state and is loaded with a load corresponding to the specified load.

Here, the specified rim refers to an "applicable rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). The specified internal pressure refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO. Additionally, the specified load refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO.

The tread portion 2 includes both ends in the tire width direction, being formed as shoulder portions 4, and sidewall portions 5 are each provided from the shoulder portions 4 to a predetermined position toward the inside in the tire radial direction. In other words, the sidewall portions 5 are disposed at two respective positions of either side of the pneumatic tire 1 in the tire lateral direction.

In addition, bead portions 20 are each positioned toward the inside of the sidewall portions 5 in the tire radial direction. The bead portions 20 are disposed at two respective positions on either side of a tire equatorial plane CL, as with the sidewall portions 5. In other words, a pair of the bead portions 20 is disposed on respective sides of either side of the tire equatorial plane CL in the tire lateral direction. In this case, the tire equatorial plane CL refers to a plane that passes through a center point of the pneumatic tire 1 in the tire lateral direction and is orthogonal to the tire rotation axis. The pair of the bead portions 20 is each provided with a bead core 21, and two bead cores 21 are provided in each of the bead portions 20. The two bead cores 21 provided on each of the bead portions 20 are disposed side by side in the tire lateral direction, i.e., each of the bead portions 20 includes an inner bead core 21a positioned relatively toward the inside in the tire lateral direction, and an outer bead core 21b positioned toward the outside of the inner bead core 21a in the tire lateral direction. The two bead cores 21 provided on each of the bead portions 20 as described above are each formed by winding a bead wire being a steel wire into an annular shape.

Bead fillers 22 are provided toward the outside of the respective bead cores 21 in the tire radial direction. The bead fillers 22 are provided corresponding to the bead cores 21, and each of the bead fillers 22 is disposed toward the outside of the corresponding one of the bead cores 21 in the tire radial direction. Specifically, the bead fillers 22 include an inner bead filler 22a disposed toward the outside of the inner bead core 21a in the tire radial direction, corresponding to the inner bead core 21a, and an outer bead filler 22b disposed toward the outside of the outer bead core 21b in the tire radial direction, corresponding to the outer bead core 21b. The bead fillers 22 are each a rubber material that is disposed in a space formed by an end portion of a carcass layer 6, described below, in the tire lateral direction being folded back toward the outside in the tire lateral direction at a position of the bead core 21.

The bead portion 20 is configured to be mountable on a rim wheel including a specified rim tapered at 5 degrees. That is, the pneumatic tire 1 according to the present first embodiment is configured to be mountable on a specified rim including a portion to be fitted with the bead portions 20, the portion being inclined at an angle, as it goes from toward the inside to toward the outside in the tire lateral direction, at an inclination angle of 5°±1° with respect to the rotation axis of the rim wheel, in a direction toward the outside in the tire radial direction.

The tread portion 2 is provided radially inside with a breaker 7. The breaker 7 has, for example, a multilayer structure in which a first breaker 71 and a second breaker 72 are layered, formed by coating a plurality of breaker codes made of steel or organic fiber material such as nylon, with coating rubber and performing a rolling process thereon. The breaker codes of the breaker 7 in the first breaker 71 and those in the second breaker 72 are different from each other in angle to the tire circumferential direction. In other words, the breaker 7 including the first breaker 71 and the second breaker 72 is formed as a so-called cross-ply structure that is formed by layering breaker codes in directions, intersecting each other. The first breaker 71 and the second breaker 72 are disposed such that the first breaker 71 is disposed toward the inside in the tire radial direction, and the second breaker 72 is disposed layering toward the outside of the first breaker 71 in the tire radial direction and on the first breaker 71.

The carcass 6 containing bias plies of carcass cords is continuously provided toward the inside of the breaker 7 in the tire radial direction and on a tire equatorial plane CL side of the sidewall portion 5 by being disposed extending between the bead portions 20 on both sides in the tire lateral direction. The carcass 6 has a multilayer structure formed by layering two carcasses of a first carcass 61 and a second carcass 62, and extends between the bead cores 21 disposed on both sides in the tire lateral direction in a toroidal shape to constitute a backbone of the tire.

Specifically, the carcass 6 is disposed extending from one bead portion 20 to the other bead portion 20 of the pair of bead portions 20 positioned on respective sides in tire lateral direction, and the first carcass 61 and the second carcass 62 are turned back toward the outside in the tire lateral direction along the bead cores 21 at the bead portions 20 to wrap around the corresponding bead cores 21 and bead fillers 22. That is, the first carcass 61 positioned relatively toward the inside of the first carcass 61 and the second carcass 62 being layered is folded back around the inner bead core 21a in the bead portion 20 to be disposed extending from toward the inside of the inner bead core 21a in the tire lateral direction to toward the outside of the inner bead core 21a in the tire lateral direction through toward the inside of the inner bead core 21a in the tire radial direction. In addition, the second carcass 62 positioned relatively toward the outside of the first carcass 61 and the second carcass 62 being layered is folded back around the outer bead core 21b at the bead portion 20 to be disposed extending from toward the inside of the outer bead core 21b in the tire lateral direction to toward the outside of the outer bead core 21b in the tire lateral direction through toward the inside of the outer bead core 21b in the tire radial direction. Accordingly, the first carcass 61 and the second carcass 62 are respectively disposed extending toward the inside and toward the outside of the bead core 21 in the tire lateral direction.

The first carcass 61 and the second carcass 62 disposed as described above are each formed by coating a plurality of carcass codes made of steel or organic fiber material such as aramid, nylon, polyester, rayon with coating rubber and performing a rolling process thereon. These carcass cords are disposed inclined at an angle θ of from 20° to 50° as an absolute value to the tire circumferential direction. The carcass 6 is formed such that the carcass cords of the first carcass 61 and the carcass cords of the second carcass 62 are disposed intersecting each other.

Figure 2:
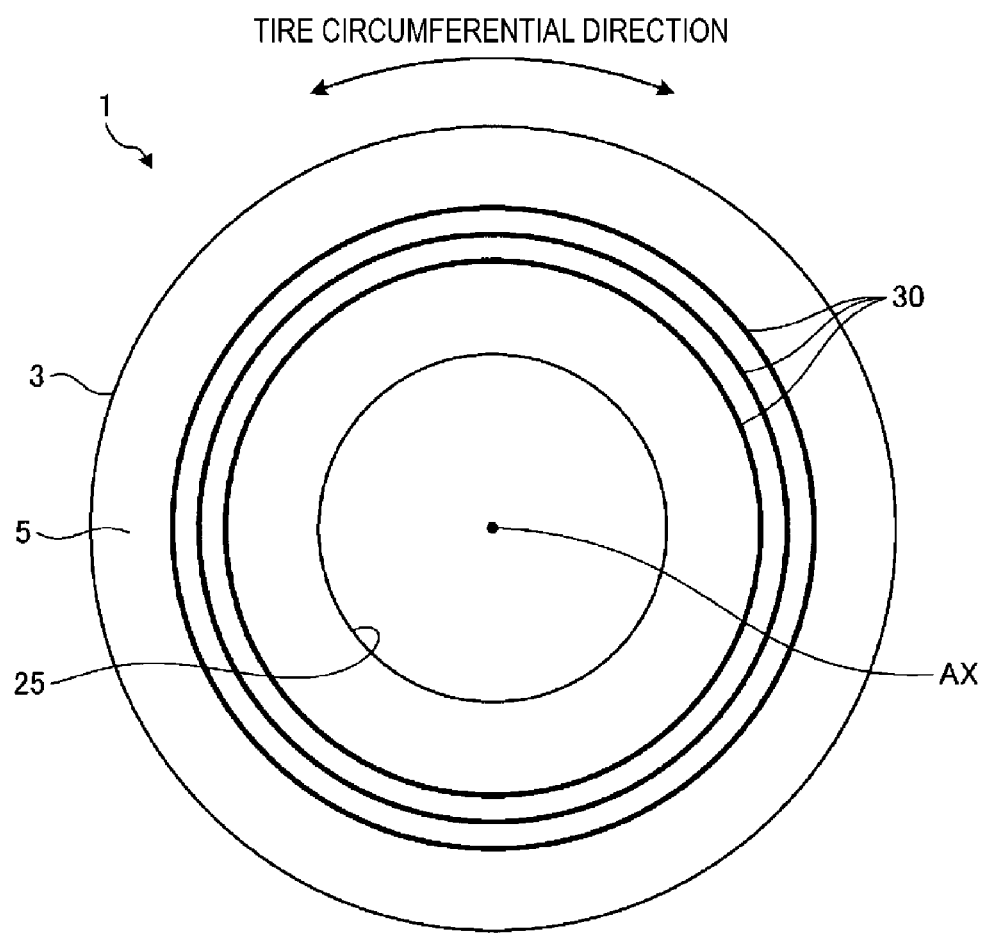
FIG. 2 is a side view of the pneumatic tire illustrated in FIG. 1 as viewed in direction A-A.

Additionally, an inner liner 8 is formed along the carcass 6, toward the inside of the carcass 6, or inside the pneumatic tire 1 from the carcass 6. FIG. 2 is a side view of the pneumatic tire 1 illustrated in FIG. 1 as viewed in direction A-A. Of the sidewall portions 5 positioned on both sides in the tire lateral direction, one of the sidewall portions 5 is provided with a plurality of protectors 30 projecting from a surface of the sidewall portions 5 while extending in the tire circumferential direction. Specifically, of the sidewall portion 5 positioned toward the inside in the direction for being mounted on a vehicle and the sidewall portion 5 positioned toward the outside in the direction for being mounted on a vehicle, the protectors 30 are provided on the sidewall portion 5 positioned toward the outside in a direction for being mounted on a vehicle when the pneumatic tire 1 is mounted on a vehicle.

The plurality of protectors 30 is all provided within a range of from 30% to 70% of a tire cross-sectional height SH from an inner end 25 of the bead portion 20 in the tire radial direction toward an outer side in the tire radial direction. In the first embodiment, three protectors 30 are provided. The three protectors 30 are disposed at respective positions different from each other in the tire radial direction, and are each formed around one circumference centered on a tire center AX being the rotation axis of the pneumatic tire 1. That is, the three protectors 30 are disposed concentrically about the tire center AX.

In this case, the tire cross-sectional height SH and placement positions of the protectors 30 in the tire radial direction are the tire cross-sectional height and placement positions in a case that a distance in the tire lateral direction between the bead portions 20 positioned on both sides in the tire lateral direction is identical to a distance in the tire lateral direction between the bead portions 20 in a state where the pneumatic tire 1 is mounted on a specified rim.

The protectors 30 are each preferably disposed including a region at or near a tire maximum width position in the sidewall portion 5. The tire maximum width position in this case is a position in the tire radial direction at a position with a maximum dimension in the tire lateral direction excluding a structure projecting from a surface of the sidewall portion 5 when the pneumatic tire 1 mounted on a specified rim and inflated to specified internal pressure is in an unloaded state without being subjected to a load.

While in the present first embodiment, three protectors 30 are provided within the range of from 30% to 70% of the tire cross-sectional height SH from the inner end 25 of the bead portion 20 toward the outer side in the tire radial direction, all of the protectors 30 are not required to be disposed in this range. At least some protectors 30 of the plurality of protectors 30 may be disposed within the range of from 30% to 70% of the tire cross-sectional height SH from the inner end 25 of the bead portion 20 toward the outer side in the tire radial direction.

Figure 3:
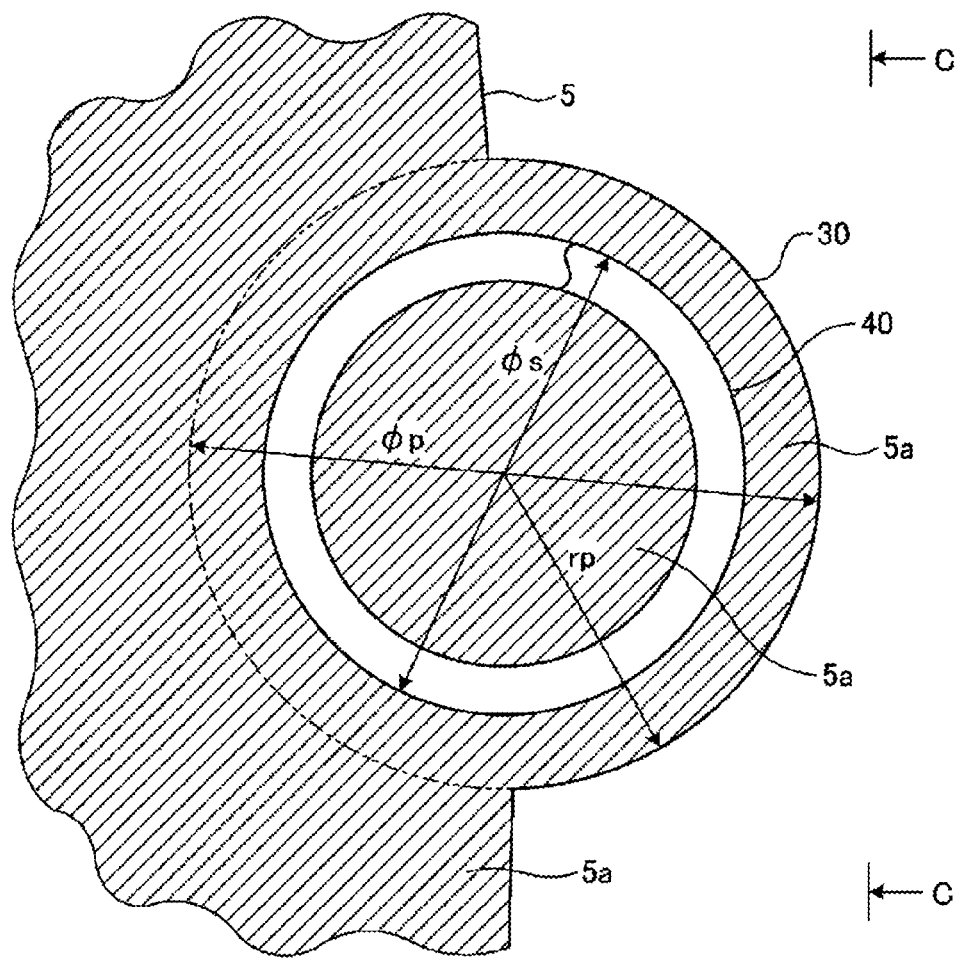
FIG. 3 is a detailed view of portion B of FIG. 1.
Figure 4:
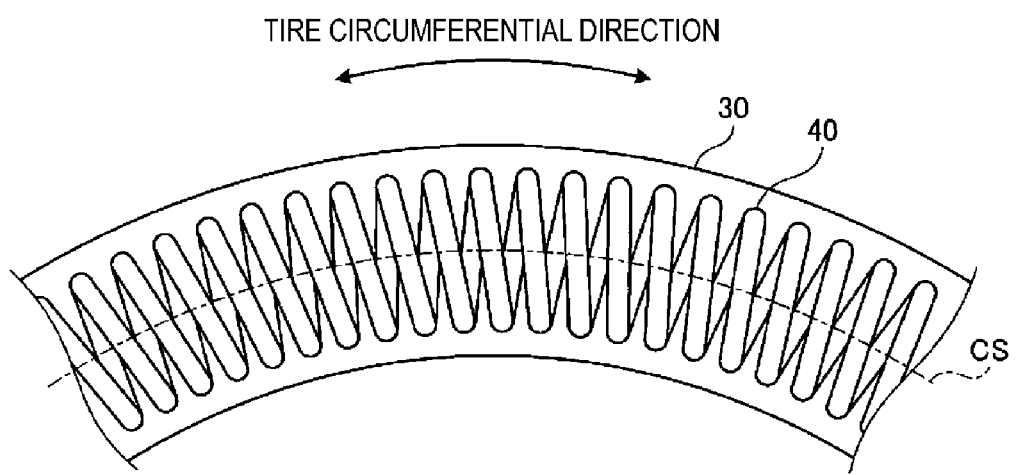
FIG. 4 is an explanatory diagram of a protector and a helical reinforcing member when the protector illustrated in FIG. 3 is viewed in direction C-C.

FIG. 3 is a detailed view of portion B of FIG. 1. FIG. 4 is an explanatory diagram of the protector 30 and a helical reinforcing member 40 when the protector 30 illustrated in FIG. 3 is viewed in direction C-C. The protector 30 having a semicircular shape in a meridian cross-section of the pneumatic tire 1 projects toward the outside in the tire lateral direction from the surface of the sidewall portion 5, and is formed in an annular shape centered on the tire center AX. Each protector 30 formed in the annular shape is disposed inside with the helical reinforcing member 40 being a reinforcing member made of metal material. The helical reinforcing member 40 includes a linear member formed in a helical shape, and a central axis CS of the helical shape is disposed inside the protector 30 in a direction extending in the tire circumferential direction.

The helical reinforcing member 40 includes a linear member formed in a helical shape, and is formed in a shape similar to that of a compression spring, for example. That is, the helical reinforcing member 40 is formed in a helical shape while portions of the linear member, adjacent to each other in a lengthwise direction of the helical shape, are separated from each other. The helical reinforcing member 40 is disposed inside the protector 30 around one circumference of the protector 30 in a direction in which the central axis CS of the spiral shape coincides with an extension direction of the protector 30. The helical reinforcing member 40 is disposed inside each of the plurality of protectors 30, i.e., a plurality of the helical reinforcing members 40 is provided corresponding to the plurality of protectors 30. The plurality of the helical reinforcing members 40 is disposed concentrically about the tire center AX, as with the plurality of protectors 30.

The helical reinforcing member 40 disposed around one circumference of the protector 30 may include a single helical reinforcing member 40 disposed around one circumference of the protector 30, and a plurality of helical reinforcing members 40 disposed continuously in the tire circumferential direction, being disposed around one circumference of the protector 30.

The helical reinforcing member 40 disposed inside the protector 30 is disposed covered with a side rubber 5a being a rubber composition constituting the sidewall portion 5. Specifically, the side rubber 5a is configured not only to cover the helical reinforcing member 40, but also to enter a gap between portions of the linear member, constituting the helical reinforcing member 40, being adjacent to each other in the lengthwise direction of the helical reinforcing member 40, and the inside of the helical reinforcing member 40.

In addition, the helical reinforcing member 40 is formed such that the helical shape has an outer diameter $\phi s$ in the range $0.1 \leq (\phi s/\phi p) \leq 0.9$ with respect to a diameter $\phi p$, which is a diameter of a circle assumed from a semicircle of the protector 30 in a meridian cross-section of the pneumatic tire 1. In other words, the helical reinforcing member 40 is formed with an outer diameter $\phi s$ of the helical shape that is in the range $0.1 \leq \{\phi s/(rp \times 2)\} \leq 0.9$ with respect to a curvature radius rp of the semicircle that is the shape of a surface of the protector 30 in the meridian cross-section of the pneumatic tire 1.

Figure 5:
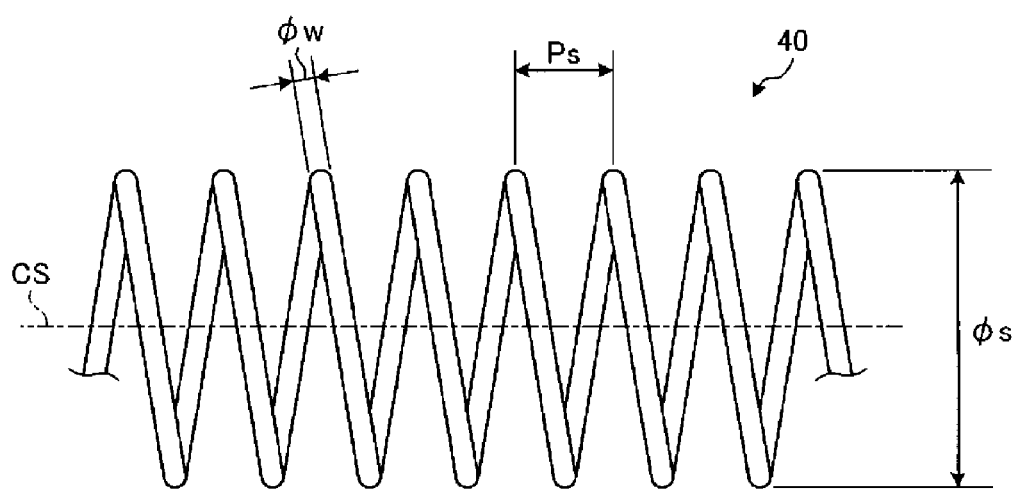
FIG. 5 is a side view of the helical reinforcing member alone illustrated in FIG. 4.

FIG. 5 is a side view of the helical reinforcing member 40 alone illustrated in FIG. 4. The helical reinforcing member 40 including the linear member formed in a helical shape has a wire diameter $\phi w$ being an outer diameter of the linear member in the range $0.5 \text{ mm} \leq \phi w \leq 10.0 \text{ mm}$. In addition, the helical reinforcing member 40 has a helical pitch Ps in the range $0.1 \leq (Ps/\phi s) \leq 3.0$ with respect to the outer diameter $\phi s$. The wire diameter $\phi w$ of the helical reinforcing member 40 is preferably in the range $1.0 \text{ mm} \leq \phi w \leq 3.5 \text{ mm}$.

The helical reinforcing member 40 made of a metal material is formed of a member having a tensile strength of 300 N/mm$^2$ or more measured in accordance with JIS (Japanese Industrial Standard) Z2241, for example, and is preferably formed of a member having a tensile strength of 900 N/mm$^2$ or more. In addition, the helical reinforcing member 40 can be formed using wire materials specified by JIS G3502 Piano wire rods, JIS G3505 Low carbon steel wire rods, JIS G3506 High carbon steel wire rods, JIS G4801 Spring steels, or JIS G4308 Stainless steel wire rods. Further, the helical reinforcing member 40 is manufactured using a metal wire specified by JIS G3521 Hard drawn steel wires, JIS G3522 Piano wires, JIS G3532 Low carbon steel wires, JIS G3560 Oil tempered wire for mechanical springs, or JIS G4314 Stainless steel wires for springs.

Vulcanization molding when the pneumatic tire 1 according to the present first embodiment is manufactured is performed using a mold formed with grooves for molding the protectors 30. When the vulcanization molding is performed, the helical reinforcing member 40, with the side rubber 5a in a sheet-like shape being wound around, is fitted into the corresponding one of the grooves for molding the protectors 30 formed in the mold, and vulcanization molding is performed together with a so-called green tire before vulcanization molding. The vulcanization molding is performed at high temperature and high pressure, so that the side rubber 5*a* around the helical reinforcing member 40 and the side rubber 5*a* of the green tire flow and enter the inside of the helical reinforcing member 40 from between portions of the linear member of the helical reinforcing member 40. Accordingly, the outside and inside of the helical shape of the helical reinforcing member 40 are covered with the side rubber 5*a*.

When the vulcanization molding is performed, the helical reinforcing member 40 with not only the side rubber 5*a* in a sheet-like shape being wound around, but also a side rubber 5*a* in a rod-like shape it is being inserted in, may be fitted into the corresponding one of the grooves of the mold. Accordingly, the side rubber 5*a* can be more reliably inserted into the inside of the helical shape of the helical reinforcing member 40.

When the pneumatic tire 1 according to the present first embodiment is mounted on a vehicle, first, the pneumatic tire 1 is mounted on a specified rim by fitting the bead portions 20 on a rim wheel having the specified rim, and then the pneumatic tire 1 is mounted on the rim wheel. The pneumatic tire 1 mounted on the rim is inflated, and then the pneumatic tire 1 mounted on the rim and inflated is mounted on a vehicle. The pneumatic tire 1 according to the present first embodiment is used as a pneumatic tire 1 for a construction vehicle, mounted on a construction vehicle such as a wheel loader used in an underground mine, for example.

When the pneumatic tire 1 is mounted on a vehicle, the sidewall portion 5 on a side with the protectors 30 formed, of the sidewall portions 5 positioned on both sides in the tire lateral direction, is positioned toward the outside in a vehicle width direction of the vehicle. In other words, the pneumatic tire 1 is mounted on a rim wheel such that the sidewall portion 5 on which the protectors 30 are formed is positioned facing toward the outside in the vehicle width direction of the vehicle when the pneumatic tire 1 is mounted on the vehicle.

When the vehicle mounted with the pneumatic tire 1 travels, the pneumatic tire 1 rotates while a portion positioned downward in the tread surface 3 comes into contact with a road surface. The vehicle travels by transferring a driving force and a braking force to the road surface or generating a turning force due to a frictional force between the tread surface 3 and the road surface. For example, when the driving force is transferred to the road surface, power generated by a prime mover such as an engine included in a vehicle is transferred to the rim wheel, and is transferred to the pneumatic tire 1 from the rim wheel.

Here, the vehicle on which the pneumatic tire 1 according to the first embodiment is mounted is a construction vehicle, so that stones, rocks, and the like are interspersed on a road surface on which the vehicle travels. Thus, during traveling of the vehicle, a stone or the like on the road surface may come into contact with a portion of the pneumatic tire 1 other than the tread surface 3. The stone or the like on the road surface may come into contact with the sidewall portion 5 positioned toward the outside in the vehicle width direction of the vehicle, i.e., the sidewall portion 5 positioned toward the outside in the vehicle mounting direction. In other words, the sidewall portion 5 positioned toward the outside in the vehicle mounting direction is positioned on an outer surface side of the vehicle as with a body surface of the vehicle, so that a stone or the like on the road surface is likely to come into contact with the sidewall portions 5 positioned toward the outside in the vehicle mounting direction.

The stone or the like has a hardness higher than the side rubber 5*a*. Thus, when the stone or the like comes into contact with the sidewall portion 5 with a large force, the stone or the like may cause a crack in the sidewall portion 5 and cause a so-called side-cut that is a kind of crack in the sidewall portion 5. When the side-cut increases in depth, a stone or the like may come into contact with the carcass 6 disposed inside of the sidewall portion 5 and cause the carcass 6 to be damaged.

In contrast, the pneumatic tire 1 according to the first embodiment includes the plurality of protectors 30 provided on the sidewall portion 5, so that a stone or the like coming into contact with the sidewall portion 5 comes into contact with the protectors 30. The protectors 30 are each formed projecting from the surface of the sidewall portion 5. Thus, when a stone or the like comes into contact with the sidewall portion 5, the stone or the like is likely to come into contact with the protectors 30, and when the stone or the like comes into contact with the protectors 30, the stone or the like is less likely to come into contact with a portion of the sidewall portion 5 other than the protectors 30.

While a stone or the like coming into contact with the protector 30 with a large force may cause a crack in the protector 30, the helical reinforcing member 40 made of a metal material is disposed inside the protector 30. Accordingly, the stone or the like comes into contact with the helical reinforcing member 40, so that the stone or the like is prevented from entering a deeper position in the sidewall portion 5. The sidewall portion 5 is reinforced against damage to the sidewall portion 5 due to a stone or the like by the helical reinforcing member 40 disposed inside the protector 30 as described above.

The protectors 30 are disposed within the range of from 30% to 70% of the tire cross-sectional height SH from the inner end 25 of the bead portion 20 in the tire radial direction toward the outer side in the tire radial direction, so that damage to the sidewall portion 5 can be effectively suppressed. In other words, a range less than 30% of the tire cross-sectional height SH from the inner end 25 of the bead portion 20 in the tire radial direction toward the outer side in the tire radial direction is close to the tire center AX in the tire radial direction and is positioned away from the road surface. Thus, a stone or the like on the road surface is less likely to come into contact with a portion in the range. In addition, a range of more than 70% of the tire cross-sectional height SH from the inner end 25 of the bead portion 20 in the tire radial direction toward the outer side in the tire radial direction is positioned closer to the tread portion 2, so that damage to the sidewall portion 5 is unlikely to occur even when the stone or the like comes into contact with a portion in the range.

In contrast, a stone or the like on the road surface is likely to come into contact with a portion in the range of from 30% to 70% of the tire cross-sectional height SH from the inner end 25 of the bead portion 20 in the tire radial direction toward the outer side in the tire radial direction, and the stone or the like coming into contact with the portion in the range may cause damage to the sidewall portion 5. Thus, disposing the protectors 30 each provided inside with the helical reinforcing member 40 to the portion in the range enables effectively suppressing damage to the sidewall portion 5 due to a stone or the like on the road surface.

Here, when a stone or the like comes into contact with the helical reinforcing member 40 with a larger force, or when a large rock comes into contact therewith, the force acting on the helical reinforcing member 40 caused by the stone or the like, acts as a force causing the helical reinforcing member 40 to peel away from the sidewall portion 5. When the helical reinforcing member 40 has a low adhesiveness with the sidewall portion 5, the helical reinforcing member 40 may peel away from the side rubber 5a of the sidewall portion 5 due to the force from the stone or the like to drop off partially or throughout the entire circumference. In a case where the helical reinforcing member 40 drops off, when a stone or the like comes into contact with a portion at a position where the helical reinforcing member 40 before the dropping off is disposed, reinforcement against the stone or the like cannot be performed by the helical reinforcing member 40. This may cause the sidewall portion 5 to be likely to be damaged.

In contrast, the pneumatic tire 1 according to the present first embodiment is formed such that the helical reinforcing member 40 disposed inside the protector 30 is formed in a helical shape. Accordingly, the side rubber 5a enters not only a gap between portions of the linear member constituting the helical reinforcing member 40, but also the inside of the helical reinforcing member 40, so that the helical reinforcing member 40 and the side rubber 5a are bonded to each other with a large force as a whole. In other words, when the side rubber 5a enters not only a gap between portions of the linear member constituting the helical reinforcing member 40, but also the inside of the helical reinforcing member 40, the helical reinforcing member 40 is restrained by the side rubber 5a, and relative movement with respect to the sidewall portion 5 is regulated by the side rubber 5a.

Accordingly, even when a stone or the like on the road surface comes into contact with the helical reinforcing member 40, and the stone or the like act as a force acting to peel the helical reinforcing member 40 away from the sidewall portion 5, the helical reinforcing member 40 is maintained in a state of being disposed inside the protector 30 without peeling from the side rubber 5a. As a result, dropping off of the helical reinforcing member 40 can be suppressed while the sidewall portion 5 is reinforced by the helical reinforcing member 40. In addition, dropping off of the helical reinforcing member 40 can be suppressed, so that reinforcement for the sidewall portion 5 with the helical reinforcing member 40 can be maintained for a long period of time.

Further, a plurality of the helical reinforcing members 40 is provided, and the plurality of the helical reinforcing members 40 is disposed concentrically about the tire center AX, so that any position in the sidewall portion 5 in the tire circumferential direction can be reinforced equally by the helical reinforcing member 40. Accordingly, even when a stone or the like comes into contact with the sidewall portion 5 at any position in the tire circumferential direction, damage to the sidewall portion 5 can be suppressed. As a result, the sidewall portion 5 can be more reliably reinforced by the helical reinforcing members 40.

The helical reinforcing member 40 has an outer diameter $\phi s$ in the range $0.1 \leq (\phi s/\phi p) \leq 0.9$ with respect to a semicircular diameter $\phi p$ of the protector 30, so that damage to the sidewall portion 5 can be more reliably suppressed by the helical reinforcing member 40 and peeling of the helical reinforcing member 40 can be suppressed. Specifically, when the outer diameter $\phi s$ of the helical reinforcing member 40 is $(\phi s/\phi p) \leq 0.1$ with respect to the semicircular diameter $\phi p$ of the protector 30, the outer diameter $\phi s$ of the helical reinforcing member 40 may be too small to have sufficient strength of the helical reinforcing member 40. In this case, when a stone or the like comes into contact with the protector 30, damage to the sidewall portion 5 caused by the stone or the like having come into contact therewith may be less likely to be suppressed by the helical reinforcing member 40. When the outer diameter $\phi s$ of the helical reinforcing member 40 is $(\phi s/\phi p) > 0.9$ with respect to the semicircular diameter $\phi p$ of the protector 30, the outer diameter $\phi s$ of the helical reinforcing member 40 is too large with respect to the diameter $\phi p$ of the semicircle of the protector 30. Thus, when a stone or the like comes into contact with the protector 30, the helical reinforcing member 40 may be likely to be exposed. When the helical reinforcing member 40 is exposed over a wide range because the helical reinforcing member 40 is likely to be exposed, a restraining force for the helical reinforcing member 40 caused by the side rubber 5a decreases. This may cause the helical reinforcing member 40 to be likely to peel away from the sidewall portion 5 and to drop off.

In contrast, when the helical reinforcing member 40 has an outer diameter $\phi s$ in the range $0.1 \leq (\phi s/\phi p) \leq 0.9$ with respect to the semicircular diameter $\phi p$ of the protector 30, damage to the sidewall portion 5 can be more reliably suppressed by ensuring strength of the helical reinforcing member 40, and peeling of the helical reinforcing member 40 away from the sidewall portion 5 can be suppressed. As a result, while the sidewall portion 5 is more reliably reinforced by the helical reinforcing member 40, dropping off of the helical reinforcing member 40 can be suppressed.

The helical reinforcing member 40 has a wire diameter $\phi w$ in the range of $0.5 \text{ mm} \leq \phi w \leq 10.0 \text{ mm}$, so that damage to the sidewall portion 5 can be more reliably suppressed by the helical reinforcing member 40 while suppressing an excessive increase in weight or rigidity of the helical reinforcing member 40. Specifically, when the wire diameter $\phi w$ of the helical reinforcing member 40 is $\phi w < 0.5$ mm, the wire diameter $\phi w$ of the helical reinforcing member 40 is too narrow. Thus, the helical reinforcing member 40 may have insufficient strength. In this case, when a stone or the like comes into contact with the protector 30, damage to the sidewall portion 5 caused by the stone or the like having come contact therewith may be less likely to be suppressed by the helical reinforcing member 40. When the wire diameter $\phi w$ of the helical reinforcing member 40 is $\phi w > 10.0$ mm, the wire diameter of the helical reinforcing member 40 is too thick. Thus, the helical reinforcing member 40 increases in weight, so that the pneumatic tire 1 may excessively increase in weight. In addition, when the wire diameter $\phi w$ of the helical reinforcing member 40 is too thick, the helical reinforcing member 40 excessively increases in the rigidity. Thus, characteristics of the pneumatic tire 1 may be greatly affected, or a difference in elasticity between the helical reinforcing member 40 and the side rubber 5a may increase, so that the helical reinforcing member 40 may be likely to peel.

In contrast, when the helical reinforcing member 40 has a wire diameter $\phi w$ in the range of $0.5 \text{ mm} \leq \phi w \leq 10.0 \text{ mm}$, damage to the sidewall portion 5 is suppressed more reliably while strength of the helical reinforcing member 40 is ensured, and excessive increase in weight of the helical reinforcing member 40, and excessive increase in rigidity of the helical reinforcing member 40, can be suppressed. As a result, while the sidewall portion 5 is more reliably reinforced by the helical reinforcing member 40, dropping off of the helical reinforcing member 40 can be suppressed without significantly changing weight and characteristics of the pneumatic tire 1.

In addition, the helical reinforcing member 40 has a helical pitch Ps with respect to the outer diameter $\phi s$ in the range $0.1 \leq (Ps/\phi s) \leq 3.0$, so that damage to the sidewall portion 5 can be more reliably suppressed by the helical reinforcing member 40 while an excessive increase in weight or rigidity of the helical reinforcing member 40 is suppressed. Specifically, when the helical pitch Ps with respect to the outer diameter ϕs of the helical reinforcing member 40 is (Ps/ϕs)≤0.1, the helical pitch Ps is too small. Thus, the helical reinforcing member 40 increases in weight, so that the pneumatic tire 1 may excessively increase in weight. In addition, when the helical pitch Ps is too small, the rigidity of the helical reinforcing member 40 is too high. Thus, characteristics of the pneumatic tire 1 may be greatly affected, or a difference in elasticity between the helical reinforcing member 40 and the side rubber 5*a* may increase, so that the helical reinforcing member 40 may be likely to peel away from the side rubber 5*a*. When the helical pitch Ps with respect to the outer diameter ϕs of the helical reinforcing member 40 is (Ps/ϕs)>3.0, the helical pitch Ps is too large. Thus, the helical reinforcing member 40 may have insufficient strength, so that when a stone or the like comes into contact with the protector 30, damage to the sidewall portion 5 caused by the stone or the like having come into contact therewith may be less likely to be suppressed by the helical reinforcing member 40.

In contrast, when the helical pitch Ps with respect to the outer diameter ϕs of the helical reinforcing member 40 is in the range 0.1≤(Ps/ϕs)≤3.0, damage to the sidewall portion 5 is suppressed more reliably while strength of the helical reinforcing member 40 is ensured, and an excessive increase in weight of the helical reinforcing member 40 and an excessive increase in rigidity of the helical reinforcing member 40, can be suppressed. As a result, while the sidewall portion 5 is more reliably reinforced by the helical reinforcing member 40, dropping off of the helical reinforcing member 40 can be suppressed without significantly changing the weight and characteristics of the pneumatic tire 1.

Second Embodiment

A pneumatic tire 1 according to a second embodiment has a configuration substantially similar to that of the pneumatic tire 1 according to the first embodiment, and has a feature of a protector 30 that is provided with an elastic reinforcing member 50 covered with a helical reinforcing member 40. Other configurations are similar to those of the first embodiment, so that a description thereof will be eliminated and the same reference numerals are used.

Figure 6:
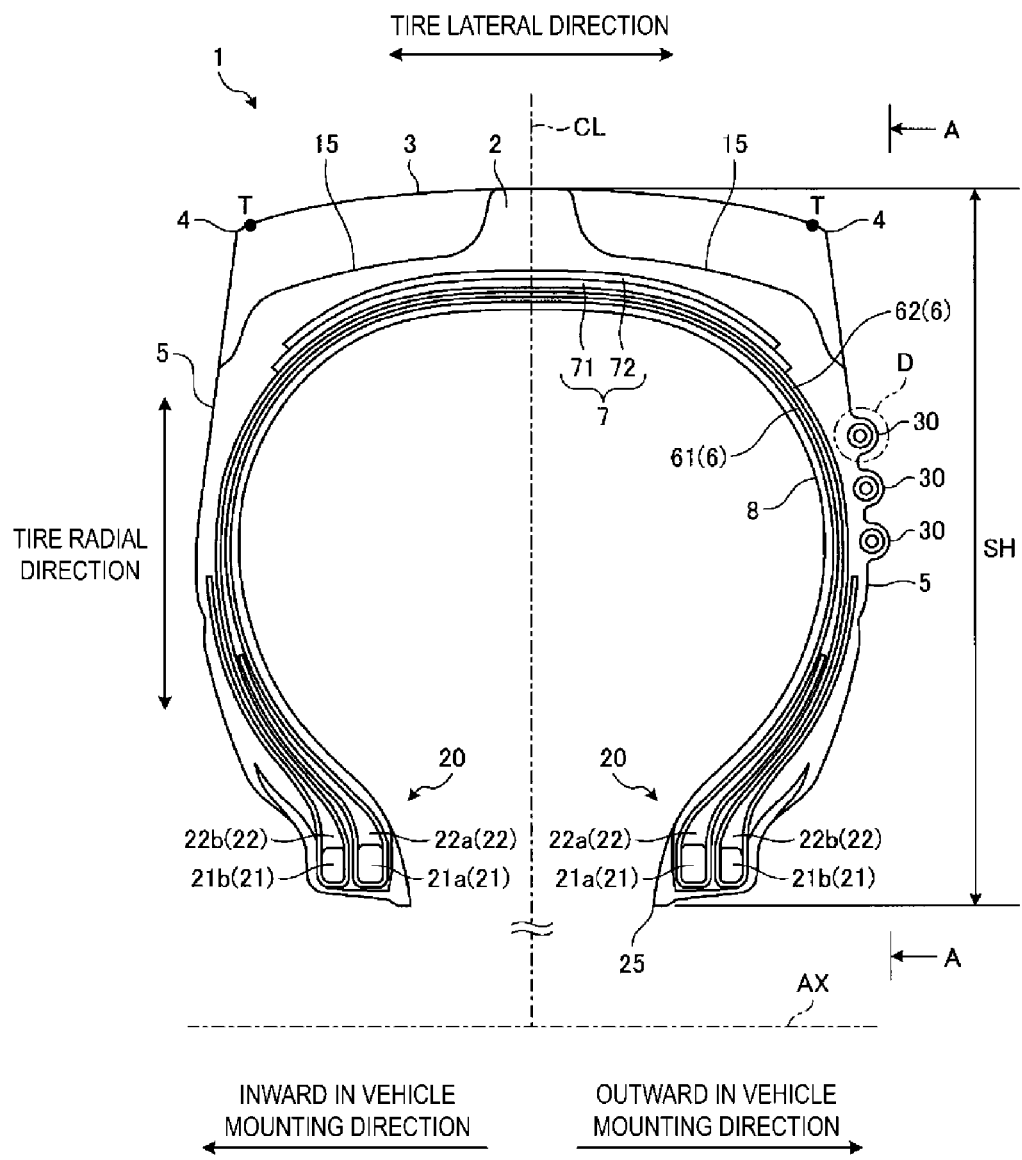
FIG. 6 is a meridian cross-sectional view illustrating a main portion of a pneumatic tire according to a second embodiment.

FIG. 6 is a meridian cross-sectional view illustrating a main portion of the pneumatic tire 1 according to the second embodiment. As with the pneumatic tire 1 according to the first embodiment, the pneumatic tire 1 according to the second embodiment includes sidewall portions 5 positioned on both sides in the tire lateral direction, in which one of the sidewall portions 5, positioned toward the outside in a vehicle mounting direction, is provided with a plurality of protectors 30 projecting from a surface of the sidewall portions 5 while extending in the tire circumferential direction. In the present second embodiment, three protectors 30 are provided as in the first embodiment. The three protectors 30 are provided within a range of from 30% to 70% of a tire cross-sectional height SH from the inner end 25 of the bead portion 20 in the tire radial direction toward the outer side in the tire radial direction, and are disposed concentrically about a tire center AX. Specifically, when viewed in direction A-A of FIG. 6, the three protectors 30 are disposed at respective positions different from each other in the tire radial direction as illustrated in FIG. 2, and are each formed around one circumference centered on the tire center AX. Accordingly, the three protectors 30 are disposed concentrically about the tire center AX.

Figure 7:
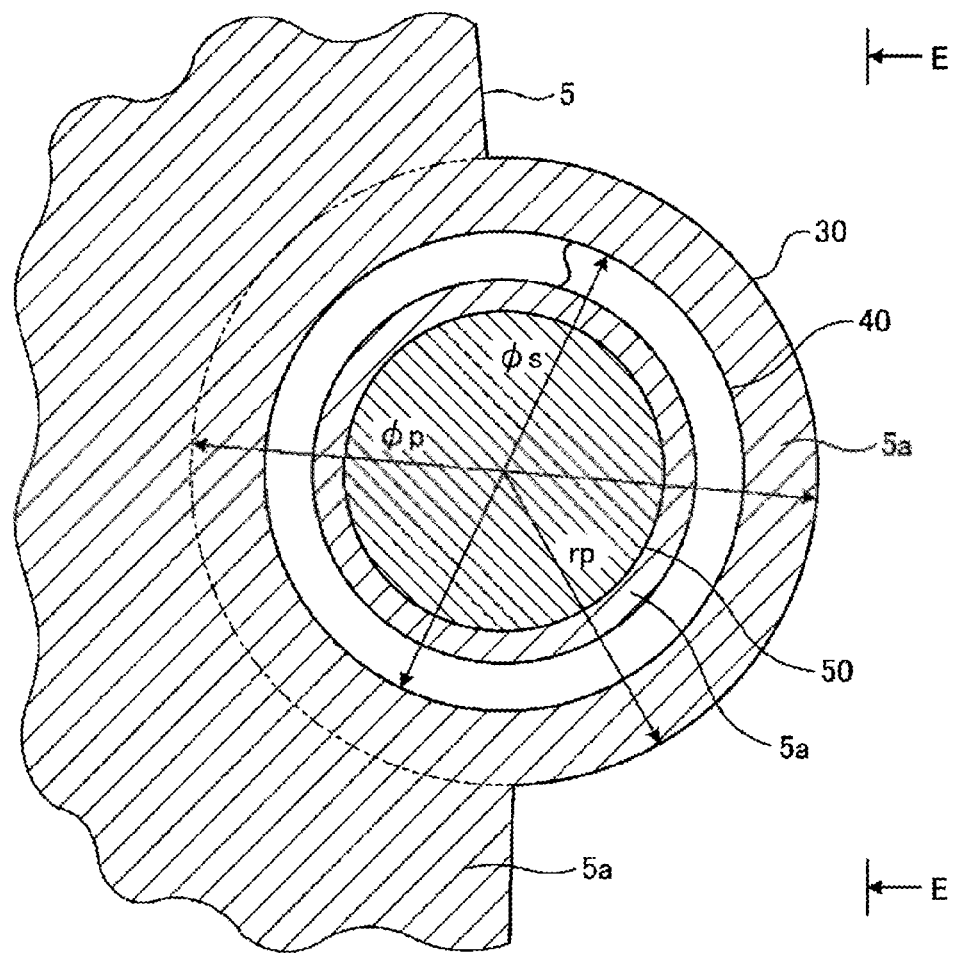
FIG. 7 is a detailed view of portion D of FIG. 6.
Figure 8:
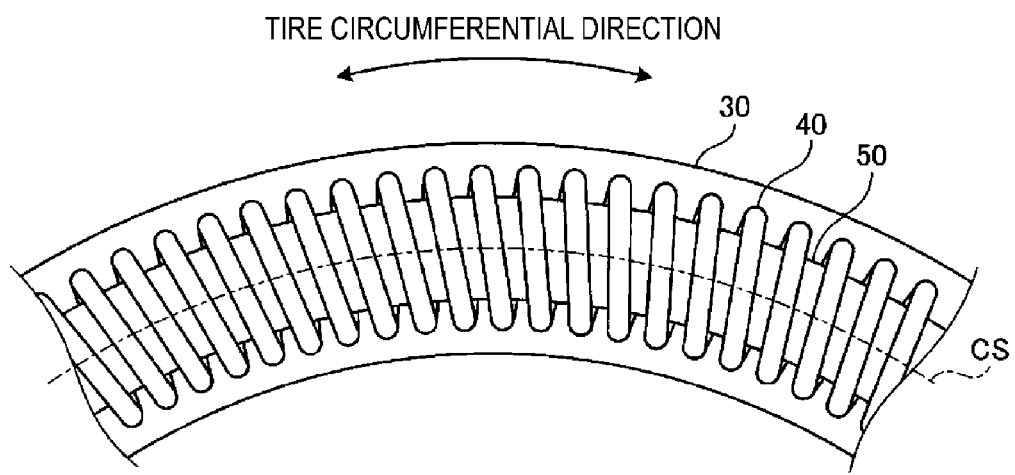
FIG. 8 is an explanatory diagram of a protector, a helical reinforcing member, and an elastic reinforcing member, when the protector illustrated in FIG. 7 is viewed in direction E-E.

FIG. 7 is a detailed view of portion D of FIG. 6. FIG. 8 is an explanatory diagram of a protector 30, a helical reinforcing member 40, and an elastic reinforcing member 50, when the protector 30 illustrated in FIG. 7 is viewed in direction E-E. As with the first embodiment, a helical reinforcing member 40, being a reinforcing member including a linear member made of metal material and formed in a helical shape, is disposed inside each protector 30 provided in a sidewall portion 5. The helical reinforcing member 40 is disposed inside the protector 30, with a central axis CS of the helical shape extending in the tire circumferential direction, and is covered with a side rubber 5*a*.

In addition, in the pneumatic tire 1 according to the second embodiment, an elastic reinforcing member 50 covered with the helical reinforcing member 40 is disposed inside the protector 30. In other words, the elastic reinforcing member 50 is inserted into the inside of the helical reinforcing member 40. The elastic reinforcement member 50 is formed in the shape of a round bar having an outer diameter smaller than an inner diameter of the helical shape of the helical reinforcement member 40, and is inserted into the inside of the helical shape of the helical reinforcement member 40, with a central axis of the round bar extending along the central axis CS of the helical shape of the helical reinforcement member 40. Accordingly, the periphery of the elastic reinforcing member 50 is covered with the helical reinforcing member 40. The elastic reinforcing member 50 is inserted into each of a plurality of the helical reinforcing members 40. Thus, a plurality of the elastic reinforcing members 50 is disposed as with the helical reinforcing members 40, and the plurality of the elastic reinforcing members 50 is disposed concentrically about the tire center AX as with the plurality of the helical reinforcing members 40.

Figure 9:
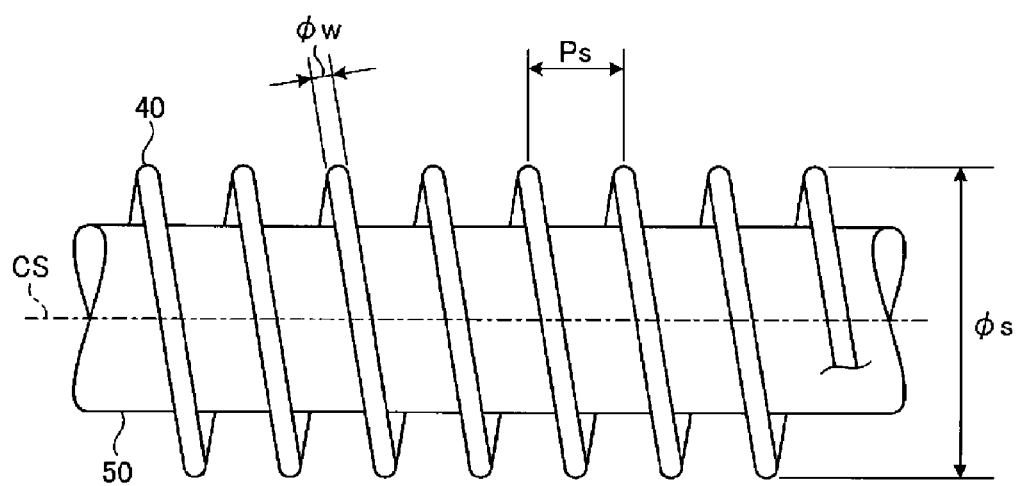
FIG. 9 is a side view of the helical reinforcing member and the elastic reinforcing member illustrated in FIG. 8.

FIG. 9 is a side view of the helical reinforcing member 40 and the elastic reinforcing member 50 illustrated in FIG. 8. The helical reinforcing member 40 including the linear member formed in a helical shape has a wire diameter ϕw being an outer diameter of the linear member in the range 0.5 mm≤ϕw≤10.0 mm. In addition, the helical reinforcing member 40 has a helical pitch Ps in the range 0.1≤(Ps/ϕs)≤3.0 with respect to the outer diameter ϕs. The elastic reinforcing member 50 covered with the helical reinforcing member 40 formed as described above has a 100% modulus in a range of from 5 times to 25 times a 100% modulus of the side rubber 5*a* adjacent to the helical reinforcing member 40. For example, when the side rubber 5*a* has a 100% modulus of approximately 2 MPa, the elastic reinforcing member 50 has a 100% modulus in a range of from 10 MPa to 50 MPa.

The elastic reinforcing member 50 has a strength at break in a range of from 10 MPa to 50 MPa, and preferably in a range of from 10 MPa to 40 MPa. The elastic reinforcing member 50 also has an elongation at break of 150% or more, and preferably in a range of from 150% to 500%.

As the elastic reinforcing member 50 having physical properties as described above, there is available a rubber composition formed by crosslinking a composition, in which a metal salt of acrylic acid or methacrylic acid is dispersed in an ethylenically unsaturated nitrile-conjugated diene-type highly saturated rubber having a content of conjugated diene units of 30% by weight or less, with an organic peroxide. More specifically, for a total of 100 parts by weight of rubber containing 40 parts by weight or more of an ethylenically unsaturated nitrile-conjugated diene-type highly saturated rubber having a content of conjugated diene units of 30% by weight or less, there is available a rubber composition containing 10 to 120 parts by weight of a metal salt of acrylic acid or methacrylic acid, and 0.3 to 10 parts by weight of an organic peroxide as a crosslinking agent. As a matter of course, various compounding agents used in the ordinary rubber industry such as a reinforcing agent, a crosslinking aid, a plasticizer, a stabilizer, and the like can be added to the rubber composition as necessary.

Examples of the ethylenically unsaturated nitrile-conjugated diene-type highly saturated rubber include: a copolymer of an ethylenically unsaturated nitrile such as acrylonitrile, methacrylonitrile, or the like with a conjugated diene such as 1,3-butadiene, isoprene, 1,3-pentadiene, or the like; and a multi-copolymer of the two monomers described above and a monomer that can be copolymerized with the two monomers described above, such as a vinyl aromatic compound, a (meth) acrylic acid, an alkyl (meth) acrylate, an alkoxyalkyl (meth) acrylate, a cyanoalkyl (meth) acrylate, or the like. Specifically, the examples include acrylonitrile-butadiene copolymer rubber, acrylonitrile-isoprene copolymer rubber, acrylonitrile-butadiene-isoprene copolymer rubber, acrylonitrile-butadiene-acrylate copolymer rubber, acrylonitrile-butadiene-acrylate-methacrylic acid copolymer rubber, and the like. In particular, hydrogenated NBR is preferred.

Examples of the metal salt of acrylic acid or methacrylic acid include zinc polymethacrylate and the like.

Examples of the organic peroxide include dicumyl peroxide, di-t-butyl peroxide, t-butyl cumyl peroxide, benzoyl peroxide, 2,5-dimethyl-2,5-di (benzoyl peroxyl) hexane, 2,5-dimethyl-2,5-mono (t-butyl peroxyl) hexane, and the like.

Vulcanization molding, when the pneumatic tire 1 according to the present second embodiment is manufactured, is performed using a mold formed with grooves for molding the protectors 30. When the vulcanization molding is performed, the helical reinforcing member 40, with the elastic reinforcing member 50 being inserted into the inside and the side rubber 5a in a sheet-like shape being wound around the helical reinforcing member 40, is fitted into the corresponding one of the grooves for molding the protectors 30 formed in the mold, and vulcanization molding is performed together with a green tire before vulcanization molding. The vulcanization molding is performed at high temperature and high pressure, so that the side rubber 5a around the helical reinforcing member 40 and the side rubber 5a of the green tire flow and enter the inside of the helical reinforcing member 40 from between portions of the linear member of the helical reinforcing member 40. Accordingly, the outside of the helical reinforcing member 40 is covered with the side rubber 5a, and the inside thereof is filled with the elastic reinforcing member 50 and the side rubber 5a.

As with the pneumatic tire 1 according to the first embodiment, the pneumatic tire 1 according to the present second embodiment is used as a pneumatic tire 1 for a construction vehicle, mounted on a construction vehicle such as a wheel loader used in an underground mine, for example. When the pneumatic tire 1 is mounted on a vehicle, the sidewall portion 5 on a side with the protectors 30 formed is positioned toward the outside in a vehicle width direction of the vehicle. During traveling of the vehicle mounted with the pneumatic tire 1, while a stone or the like on a road surface may come into contact the sidewall portion 5 positioned toward the outside in the vehicle width direction of the vehicle, the plurality of protectors 30 is provided on the sidewall portion 5, and thus the stone or the like coming into contact with the sidewall portion 5 comes into contact with the protectors 30.

While a stone or the like coming into contact with the protector 30 with a large force may cause a crack in the protector 30, the elastic reinforcing member 50 covered with the helical reinforcing member 40 made of a metal material is disposed inside the protector 30. Accordingly, the stone or the like comes into contact with the helical reinforcing member 40 and the elastic reinforcing member 50, so that the stone or the like is suppressed from entering a deeper position in the sidewall portion 5. The sidewall portion 5 is reinforced against damage to the sidewall portion 5 due to a stone or the like by the helical reinforcing member 40 and the elastic reinforcing member 50 disposed inside the protector 30 as described above.

The elastic reinforcing member 50 disposed inside the protector 30 has elasticity, and thus may be crushed by elastically deforming when a large pressure is applied thereto. Thus, when the elastic reinforcing member 50 is disposed inside the protector 30 alone, the elastic reinforcing member 50 may be deformed and crushed due to pressure during vulcanization molding when the vulcanization molding of the green tire is performed. The pressure applied to the green tire during the vulcanization molding is a force pressing the green tire from toward the inside against a mold disposed toward the outside of the green tire, and thus when the elastic reinforcing member 50 deforms due to the pressure during the vulcanization molding, the elastic reinforcing member 50 is crushed in a direction in which the elastic reinforcing member 50 decreases in thickness in a thickness direction of the sidewall portion 5. When the elastic reinforcing member 50 decreases in thickness, the elastic reinforcing member 50 itself may be damaged when a stone or the like comes into contact with the elastic reinforcing member 50. Thus, it may be difficult to suppress damage to the sidewall portion 5 with the elastic reinforcing member 50.

In contrast, the pneumatic tire 1 according to the present second embodiment includes the elastic reinforcing member 50 that is covered with the helical reinforcing member 40 made of a metal material. Accordingly, when pressure during vulcanization molding of the green tire acts around the elastic reinforcing member 50, the pressure is received by the helical reinforcing member 40, and thus a large pressure is less likely to act on the elastic reinforcing member 50. This causes the elastic reinforcing member 50 to be less likely to be crushed by the pressure during the vulcanization molding, so that the shape of a round bar is maintained. As a result, deformation of the elastic reinforcing member 50, which is a reinforcing member having elasticity, can be suppressed.

Deformation of the elastic reinforcing member 50 can be suppressed, and thus, when a stone or the like comes into contact with the elastic reinforcing member 50, the stone or the like can be more reliably prevented from entering a deeper position in the sidewall portion 5. As a result, the sidewall portion 5 can be more reliably reinforced, and damage to the sidewall portion 5 can be suppressed.

There are provided a plurality of the helical reinforcing members 40 and a plurality of the elastic reinforcing members 50, and the plurality of the helical reinforcing members 40 and the plurality of the elastic reinforcing members 50 are disposed concentrically about the tire center AX. Thus, any position in the sidewall portion 5 in the tire circumferential direction can be reinforced equally by the helical reinforcing member 40 and the elastic reinforcing member 50. Accordingly, even when a stone or the like comes into contact with the sidewall portion 5 at any position in the tire circumferential direction, damage to the sidewall portion 5 can be suppressed. As a result, the sidewall portion 5 can be more reliably reinforced by the helical reinforcing members 40 and the elastic reinforcing members 50.

The elastic reinforcing member 50 has a 100% modulus in a range of from 5 times to 25 times a 100% modulus of the side rubber 5a adjacent to the helical reinforcing member 40, so that a reinforcing effect of the elastic reinforcing member 50 can be more reliably ensured while peeling of the elastic reinforcing member 50 is suppressed. In other words, when the elastic reinforcing member 50 has a 100% modulus less than 5 times a 100% modulus of the side rubber 5a adjacent to the helical reinforcing member 40, it may be difficult to ensure the reinforcing effect of the elastic reinforcing member 50. In addition, when the elastic reinforcing member 50 has a 100% modulus more than 25 times the 100% modulus of the side rubber 5a adjacent to the helical reinforcing member 40, the difference from the 100% modulus of the side rubber 5a is too large. Thus, when the sidewall portion 5 deforms, the elastic reinforcing member 50 may be likely to peel away from the sidewall portion 5.

In contrast, when the elastic reinforcing member 50 has a 100% modulus in a range of from 5 times to 25 times the 100% modulus of the side rubber 5a adjacent to the helical reinforcing member 40, the reinforcing effect of the elastic reinforcing member 50 can be more reliably ensured while peeling of the elastic reinforcing member 50 is suppressed. As a result, the sidewall portion 5 can be more reliably reinforced.

In addition, the elastic reinforcing member 50 has an elongation at break of 150% or more when having a strength at break in a range of from 10 MPa to 50 MPa, so that the reinforcing effect of the elastic reinforcing member 50 can be more reliably ensured while peeling of the elastic reinforcing member 50 is suppressed. In other words, when the elastic reinforcing member 50 has a strength at break less than 10 MPa, it may be difficult to ensure the reinforcing effect of the elastic reinforcing member 50. In addition, when the elastic reinforcing member 50 has a strength at break more than 50 MPa, a difference in hardness from the side rubber 5a is too large. Thus, when the sidewall portion 5 deforms, the elastic reinforcing member 50 may be likely to peel away from the sidewall portion 5. When the elastic reinforcing member 50 has an elongation at break less than 150%, followability to deformation of the sidewall portion 5 deteriorates.

In contrast, when the elastic reinforcing member 50 has a strength at break in the range of from 10 MPa to 50 MPa and an elongation at break of 150% or more, followability of the elastic reinforcing member 50 to the sidewall portion 5 can be ensured while peeling of the elastic reinforcing member 50 is suppressed, and also the reinforcing effect of the elastic reinforcing member 50 can be more reliably ensured. As a result, the sidewall portion 5 can be more reliably reinforced.

Modified Example

Figure 10:
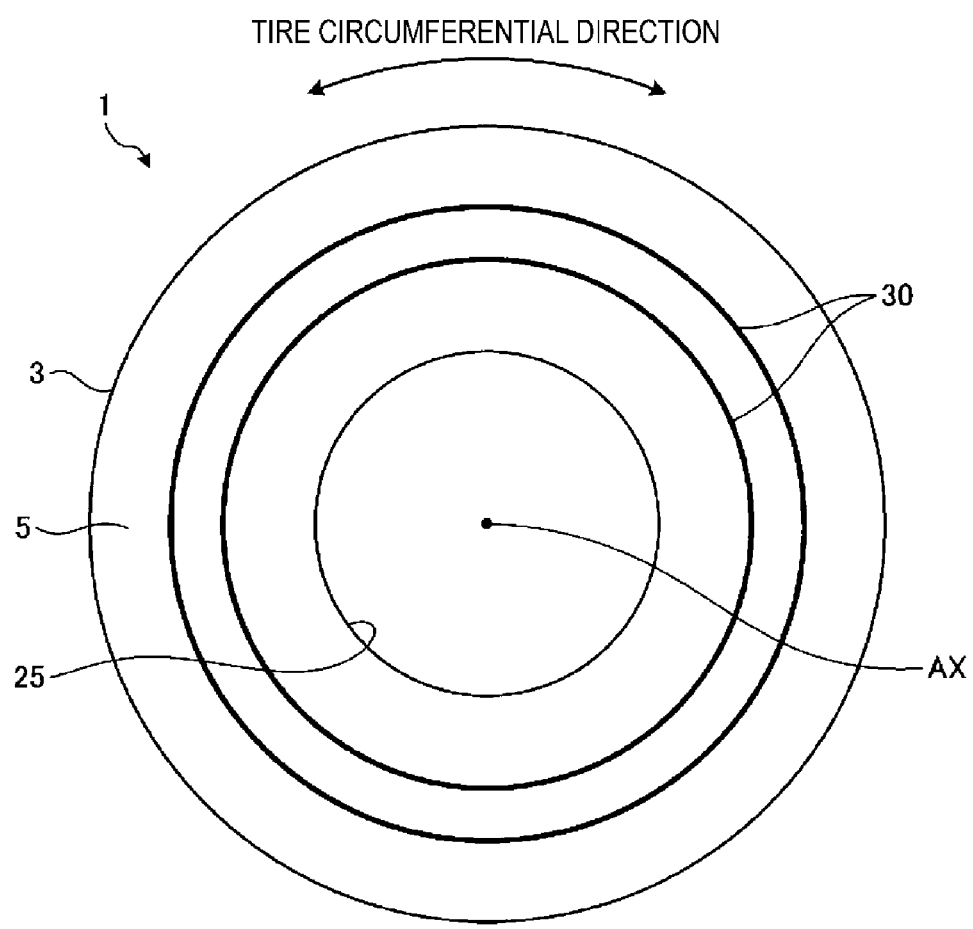
FIG. 10 is an explanatory diagram of a modified example of the pneumatic tires according to first and second embodiments, including two protectors.

While the pneumatic tire 1 according to each of the first and second embodiments described above includes three protectors 30, the number of the protectors 30 may be other than three. FIG. 10 is an explanatory diagram of a modified example of the pneumatic tires 1 according to first and second embodiments, including two protectors 30. As illustrated in FIG. 10, two protectors 30 each provided inside with a helical reinforcing member 40, or two protectors 30 each provided inside with an elastic reinforcing member 50 covered with the helical reinforcing member 40, may be formed such that the two protectors 30 are each formed around one circumference in the tire circumferential direction, and are disposed concentrically about the tire center AX. Alternatively, four or more protectors 30 may be disposed concentrically about the tire center AX.

Figure 11:
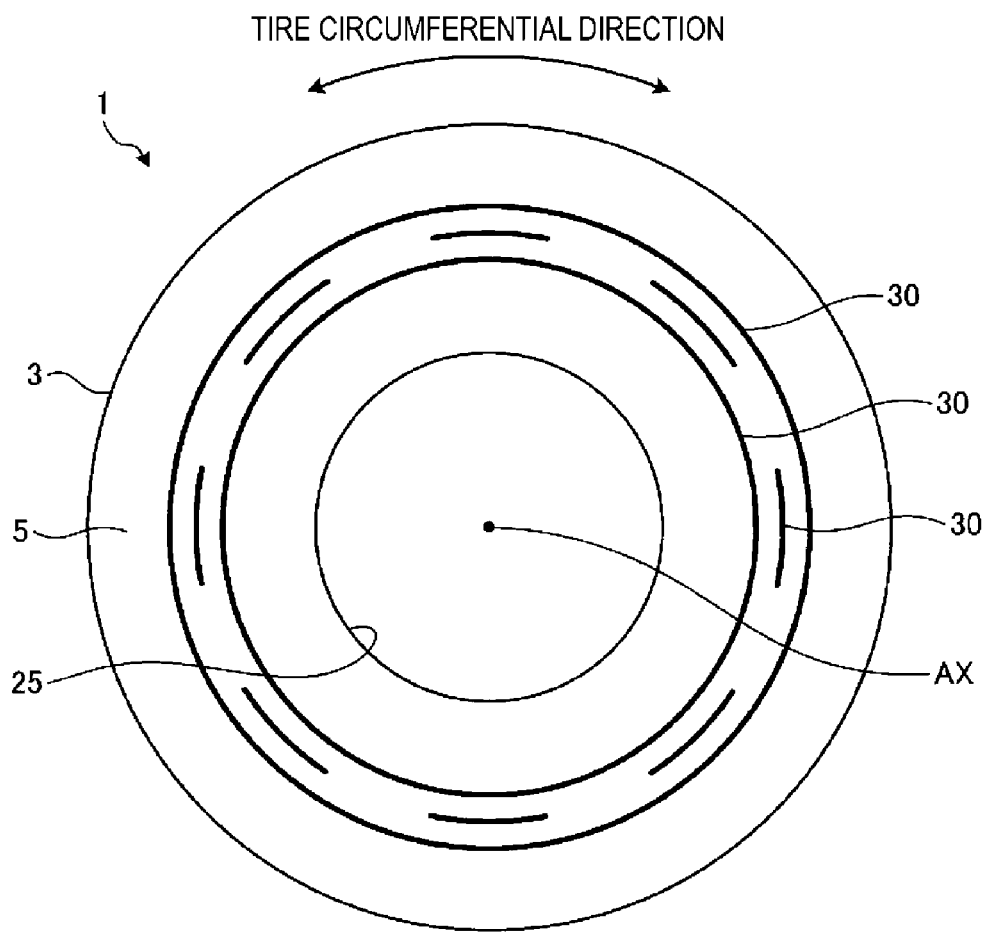
FIG. 11 is an explanatory diagram of a modified example of the pneumatic tires according to first and second embodiments, including protectors any of which is discontinuous.
Figure 12:
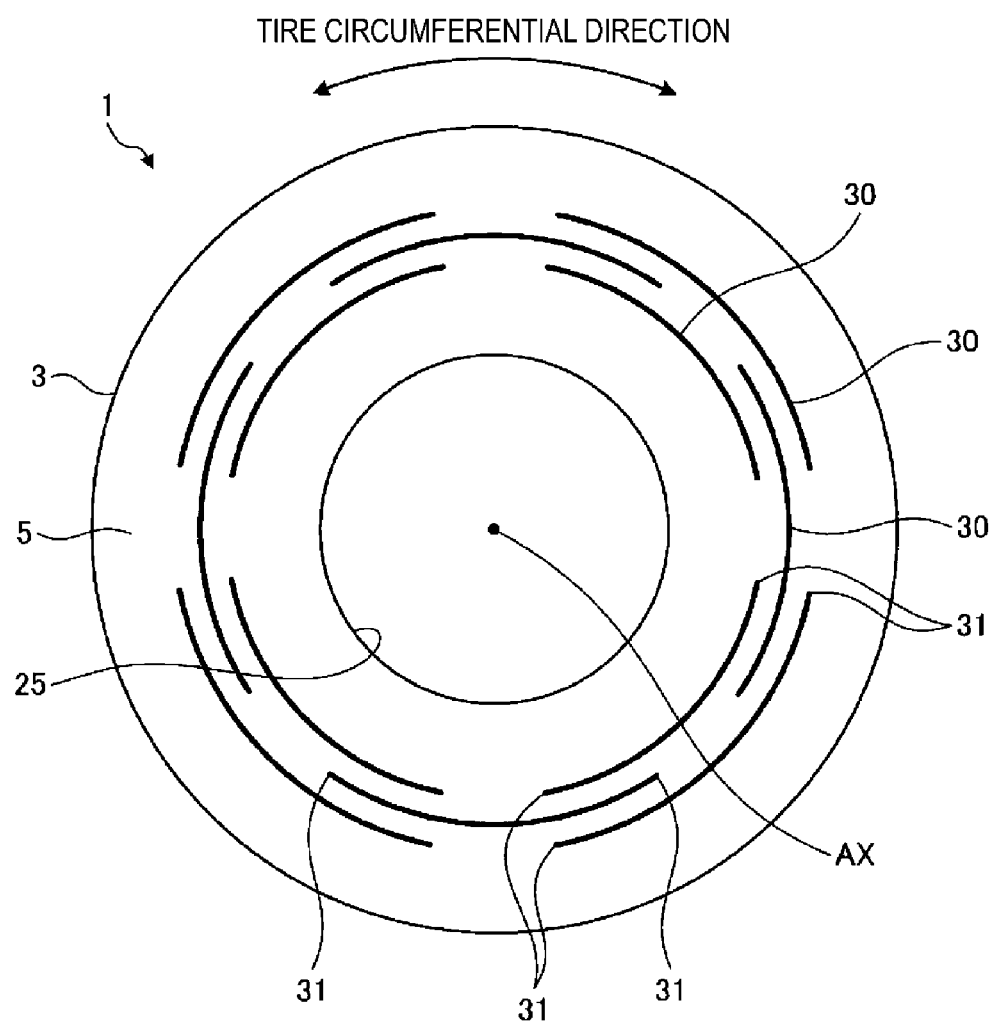
FIG. 12 is an explanatory diagram of a modified example of the pneumatic tires according to first and second embodiments, including protectors all of which are discontinuous.

While in the pneumatic tire 1 according to each of the first and second embodiments described above, the protector 30 is formed continuously around one circumference, the protector 30 is not necessarily formed around one circumference. FIG. 11 is an explanatory diagram of a modified example of the pneumatic tires 1 according to first and second embodiments, including protectors 30 any of which is discontinuous. FIG. 12 is an explanatory diagram of a modified example of the pneumatic tires 1 according to first and second embodiments, including protectors 30 all of which are discontinuous. As illustrated in FIG. 11, a plurality of protectors 30 each provided inside with the helical reinforcing member 40, or a plurality of protectors 30 each provided inside with the elastic reinforcing member 50 covered with the helical reinforcing member 40, may be formed such that any protector 30 of the plurality of protectors 30 disposed concentrically side by side in the tire radial direction is not formed around one circumference. That is, any protector 30 of the plurality of protectors 30 may be formed discontinuously in the tire circumferential direction while being divided in the tire circumferential direction. In this case, the helical reinforcing member 40 and the elastic reinforcing member 50 disposed inside the protector 30 formed discontinuously in the tire circumferential direction are also disposed discontinuously in the tire circumferential direction while being divided in the tire circumferential direction as with the protector 30.

Alternatively, as illustrated in FIG. 12, a plurality of protectors 30 each provided inside with the helical reinforcing member 40, or a plurality of protectors 30 each provided inside with the elastic reinforcing member 50 covered with the helical reinforcing member 40, may be formed such that all of the protectors 30 are formed discontinuously in the tire circumferential direction. In this case, a divided portion in the protector 30 is preferably disposed at a position in the tire circumferential direction such that the position is not identical in all of the protectors 30. In other words, the divided portion in the protector 30 is preferably disposed at a position in the tire circumferential direction such that positions of ends 31 of the divided portion of each of the protectors 30 in the tire circumferential direction are not identical in all of the protectors 30. Accordingly, even when the protectors 30 are formed discontinuously in the tire circumferential direction, any of the protectors 30 is disposed at any position on the tire circumference. As described above, one or more protectors 30 may be disposed at any position on the tire circumference.

In other words, at least one of the helical reinforcing members 40 disposed inside the respective protectors 30 as in the first embodiment may be disposed at any position on the tire circumference in the sidewall portion 5 provided with the helical reinforcing members 40. Likewise, at least one of the helical reinforcing member 40 and the elastic reinforcing member 50 disposed inside the respective protectors 30 as in the second embodiment may be disposed at any position on the tire circumference in the sidewall portion 5 provided with the helical reinforcing members 40 and the elastic reinforcing members 50. When there is at least one of the protectors 30 each provided inside with the helical reinforcing member 40, or at least one of the protectors 30 each provided inside with the helical reinforcing member 40 and the elastic reinforcing member 50, the sidewall portion 5 is reinforced at any position on the tire circumference to enable reducing side-cuts therein.

While in the pneumatic tire 1 according to each of the first and second embodiments described above, the protector 30 is provided on the sidewall portion 5 positioned toward the outside in the vehicle mounting direction of the sidewall portions 5 positioned on both sides in the tire lateral direction, the protector 30 may be provided on another sidewall portion 5. For example, the protector 30 may be provided on the side wall portions 5 on both sides in the tire lateral direction. The protector 30 may be provided on at least one sidewall portion 5 of the sidewall portions 5 positioned on the both sides in the tire lateral direction.

While the pneumatic tire 1 according to each of the first and second embodiments described above has a so-called bias structure in which carcass cords of the layered carcass 6 intersect each other, the pneumatic tire 1 with the sidewall portion 5 including the protector 30 disposed inside with the helical reinforcing member 40 and the pneumatic tire 1 with the sidewall portion 5 including the protector 30 disposed inside with the elastic reinforcing member 50 covered with the helical reinforcing member 40 each may have a radial structure.

EXAMPLES

FIGS. 13A and 13B are each a table showing results of first performance evaluation tests of pneumatic tires 1. FIGS. 14A and 13B are each a table showing results of second performance evaluation tests of pneumatic tires 1. In relation to the pneumatic tire 1 described above, the first and second performance evaluation tests performed on a pneumatic tires 1 of Conventional Example and pneumatic tires 1 according to embodiments of the present technology will be described below. The first performance evaluation tests of the performance evaluation tests were performed to evaluate the number of side-cuts, length of the side-cuts, depth of the side-cuts, and a dropping-off place of a reinforcing member. The second performance evaluation tests were performed to evaluate the number of side-cuts, length of the side cuts, depth of the side-cuts, and whether there was a deformed elastic reinforcing member 50.

The first and second performance evaluation tests were each performed with a pneumatic tire 1 having a tire nominal size of 18.00-25 (32 PR) mounted on a rim wheel conforming to the TRA standard and inflated to 750 kPa, the pneumatic tire 1 being mounted on a front wheel opposite to a driver seat of a dump truck for an underground mine, used as an evaluation test vehicle that traveled for three months.

The number of side-cuts of the evaluation items in the first and second performance evaluation tests was acquired by counting the number of side-cuts generated in the sidewall portion 5 provided with the protector 30. The length of side-cut and the depth of the side-cut of the evaluation items in the first and second performance evaluation tests were acquired by measuring lengths and depths of side-cuts generated in the sidewall portion 5 provided with the protector 30, and calculating an average of the lengths and an average of the depths.

The dropping-off place of a reinforcing member of the evaluation items in the first performance evaluation tests was evaluated by counting the number of places with the reinforcing member dropping off in the reinforcing member provided inside the protector 30 due to damage to the surface of the sidewall portion 5.

Whether there was a deformed elastic reinforcing member 50 of the evaluation items in the second performance evaluation tests was evaluated by cutting the pneumatic tire 1 after testing in a meridian cross-section and observing a degree of deformation of the elastic reinforcing member 50. The deformation of the elastic reinforcing member 50 was evaluated by measuring thickness of the elastic reinforcing member 50 at a position with a maximum thickness thereof in a direction in which the elastic reinforcing member 50 was crushed when the elastic reinforcing member 50 was crushed and deformed in a predetermined direction from a circular shape being the shape of the elastic reinforcing member 50 in the meridian cross-section of the pneumatic tire 1. It was determined whether the elastic reinforcing member 50 was deformed by determining that the elastic reinforcing member 50 was deformed when the thickness at the position with the maximum thickness thereof in the direction in which the elastic reinforcing member 50 was crushed was less than 50% of a diameter of the circular shape before being crushed, and by determining that the elastic reinforcing member 50 was not deformed when the thickness thereat was equal to or more than 50% thereof. The whether there is a deformed elastic reinforcing member 50 may be evaluated by cutting a pneumatic tire 1, in the same shape as the pneumatic tire 1 to be tested, in a meridian cross-section and observing a degree of deformation of the elastic reinforcing member 50, instead of using the pneumatic tire 1 after test running.

The first evaluation tests were performed on fourteen types of pneumatic tire of Conventional Examples 1-1 and 1-2 that are each an example of a conventional pneumatic tire 1, and Examples 1-1 to 1-12 that are each the pneumatic tire 1 according to the embodiment of the present technology. The pneumatic tire of Conventional Example 1-1 of these pneumatic tires 1 does not include the protector 30 provided on the sidewall portion 5, and thus no reinforcing member disposed inside the protector 30 is provided. While the pneumatic tire of Conventional Example 1-2 includes the protector 30 provided on the sidewall portion 5 and the protector 30 is provided inside with a reinforcing member, the reinforcing member is an elastic reinforcing member such as that described in Japan Patent No. 3628279.

In contrast, Examples 1-1 to 1-12 that are each an example of the pneumatic tire 1 according to the embodiment of the present technology, and that each include the sidewall portion 5 provided with the protector 30, and the reinforcing member disposed inside the protector 30 is the helical reinforcing member 40. The pneumatic tires 1 according to Examples 1-1 to 1-12 are different in the number of helical reinforcing members 40, ratio of an outer diameter $\phi s$ of the helical reinforcing member 40 to a semicircular diameter $\phi p$ of the protector 30, and wire diameter $\phi w$ of the helical reinforcing member 40.

As a result of performing the first evaluation tests using these pneumatic tires 1, the pneumatic tires 1 according to Example 1-1 to 1-12 each enable suppression of dropping off of the helical reinforcing member 40 while generally providing reduction in length and depth of side-cuts compared to Conventional Examples, as shown in FIGS. 13A and 13B. In other words, the pneumatic tires 1 according to Examples 1-1 to 1-12 each enable suppression of dropping off of the helical reinforcing member 40 while providing reinforcement of the sidewall portion 5 with the spiral reinforcing member 40.

In addition, the second evaluation tests were performed on ten types of pneumatic tire of Conventional Examples 2-1 and 2-2 that are each an example of a conventional pneumatic tire 1, and Examples 2-1 to 2-8 that are each the pneumatic tire 1 according to the embodiment of the present technology. The pneumatic tire of Conventional Example 2-1 of these pneumatic tires 1 does not include the protector 30 provided on the sidewall portion 5, and thus no reinforcing member disposed inside the protector 30 is provided. While the pneumatic tire of Conventional Example 2-2 includes the protector 30 provided on the sidewall portion 5 and the protector 30 is provided inside with a reinforcing member, the reinforcing member includes only the elastic reinforcing member 50.

In contrast, Examples 2-1 to 2-8 that are each an example of the pneumatic tire 1 according to the embodiment of the present technology, and that each include the sidewall portion 5 provided with the protector 30, and the reinforcing member disposed inside the protector 30 is the elastic reinforcing member 50 covered with the helical reinforcing member 40. The pneumatic tires 1 according to Examples 2-1 to 2-8 are different in strength at break and elongation at break of the elastic reinforcing member 50, ratio of an outer diameter $\phi s$ of the helical reinforcing member 40 to a semicircular diameter $\phi p$ of the protector 30, and wire diameter $\phi w$ of the helical reinforcing member 40.

As a result of performing the second evaluation tests using these pneumatic tires 1, the pneumatic tires 1 according to Examples 2-1 to 2-8 each enable generally providing reduction in length and depth of side-cuts compared to Conventional Examples and enable suppression of deformation of the elastic reinforcing member 50, as shown in FIGS. 14A and 14B. In other words, the pneumatic tires 1 according to Examples 2-1 to 2-8 each enable suppression of deformation of the elastic reinforcing member 50 having elasticity.

The invention claimed is:

1. A pneumatic tire comprising:
   sidewall portions positioned on both sides in a tire lateral direction;
   bead portions positioned toward the inside of the respective sidewall portions in a tire radial direction;
   a plurality of protectors extending in a tire circumferential direction and projecting from a surface of the sidewall portion in the sidewall portion of at least one of the sidewall portions, provided within a range of from 30% to 70% of a tire cross-sectional height from an inner end of the bead portions in the tire radial direction toward an outer side in the tire radial direction;
   a plurality of helical reinforcing members each formed in a helical shape and disposed inside the plurality of protectors, the helical reinforcing members each having a central axis of the helical shape, the central axis extending in the tire circumferential direction; and
   an elastic reinforcing member covered with one of the plurality of helical reinforcing members.

2. The pneumatic tire according to claim 1, wherein the plurality of helical reinforcing members is disposed concentrically about a tire center.

3. The pneumatic tire according to claim 2, wherein one or more of the plurality of helical reinforcing members are disposed at any position on a tire circumference in the sidewall portion where the plurality of helical reinforcing members are disposed.

4. The pneumatic tire according to claim 1, wherein one or more of the plurality of helical reinforcing members are disposed at any position on a tire circumference in the sidewall portion where the plurality of helical reinforcing members are disposed.

5. The pneumatic tire according to claim 1, wherein the plurality of helical reinforcing members and the elastic reinforcing members are disposed concentrically about the tire center.

6. The pneumatic tire according to claim 5, wherein one or more of the plurality of helical reinforcing members and the elastic reinforcing members are disposed at any position on the tire circumference in the sidewall portion where the plurality of helical reinforcing members and the elastic reinforcing members are disposed.

7. The pneumatic tire according to claim 6, wherein the elastic reinforcing member has a 100% modulus within a range of from 5 times to 25 times a 100% modulus of a rubber composition of the sidewall portion adjacent to the plurality of helical reinforcing members.

8. The pneumatic tire according to claim 7, wherein the elastic reinforcing member has an elongation at break of 150% or more with a strength at break within a range of from 10 MPa to 50 MPa.

9. The pneumatic tire according to claim 8, wherein
   each of the plurality of protectors has a semicircular shape in a meridian cross-section of the pneumatic tire, and
   each of the plurality of helical reinforcing members has an outer diameter $\phi s$ in the range $0.1 \leq (\phi s/\phi p) \leq 0.9$ with respect to a semicircular diameter $\phi p$ of each of the plurality of the protectors.

10. The pneumatic tire according to claim 9, wherein the plurality of helical reinforcing members each have a wire diameter $\phi w$ in the range $0.5 \text{ mm} \leq \phi w \leq 10.0 \text{ mm}$.

11. The pneumatic tire according to claim 1, wherein one or more of the plurality of helical reinforcing members and the elastic reinforcing members are disposed at any position on the tire circumference in the sidewall portion where the plurality of helical reinforcing members and the elastic reinforcing members are disposed.

12. The pneumatic tire according to claim 1, wherein the elastic reinforcing member has a 100% modulus within a range of from 5 times to 25 times a 100% modulus of a rubber composition of the sidewall portion adjacent to the plurality of helical reinforcing members.

13. The pneumatic tire according to claim 1, wherein the elastic reinforcing member has an elongation at break of 150% or more with a strength at break within a range of from 10 MPa to 50 MPa.

14. The pneumatic tire according to claim 1, wherein
   each of the plurality of protectors has a semicircular shape in a meridian cross-section of the pneumatic tire, and
   each of the plurality of helical reinforcing members has an outer diameter $\phi s$ in the range $0.1 < (\phi s/\phi p) \leq 0.9$ with respect to a semicircular diameter $\phi p$ of each of the plurality of the protectors.

15. The pneumatic tire according to claim 1, wherein the plurality of helical reinforcing members each have a wire diameter $\phi w$ in the range $0.5 \text{ mm} \leq \phi w \leq 10.0 \text{ mm}$.

* * * * *